United States Patent
Mudholkar

(10) Patent No.: US 11,989,680 B1
(45) Date of Patent: May 21, 2024

(54) SYSTEMS AND METHODS OF FACILITATING MODELING EXPERTISE OF INDIVIDUALS

(71) Applicant: Ranjeet Sreekant Mudholkar, Phoenix, AZ (US)

(72) Inventor: Ranjeet Sreekant Mudholkar, Phoenix, AZ (US)

(73) Assignee: Next League Executive Board LLC, Phoenix, AZ (US)

( * ) Notice: Subject to any disclaimer, the term of this patent is extended or adjusted under 35 U.S.C. 154(b) by 0 days.

(21) Appl. No.: 18/092,214

(22) Filed: Dec. 31, 2022

(51) Int. Cl.
*G06Q 10/00* (2023.01)
*G06Q 10/0639* (2023.01)

(52) U.S. Cl.
CPC .............. *G06Q 10/06398* (2013.01)

(58) Field of Classification Search
CPC .. G06Q 10/06; G06Q 10/063; G06Q 10/0639; G06Q 10/06398; G06Q 10/06395; G06Q 10/06393
See application file for complete search history.

(56) References Cited

U.S. PATENT DOCUMENTS

| | | | |
|---|---|---|---|
| 11,579,841 B1 * | 2/2023 | Eich ...................... | G06F 9/4881 |
| 2017/0236094 A1 * | 8/2017 | Shah .................... | H04L 9/0637 705/300 |
| 2018/0300393 A1 * | 10/2018 | Brandstetter ...... | G06Q 30/0251 |
| 2019/0057310 A1 * | 2/2019 | Olmstead ............... | G06F 40/30 |
| 2020/0090234 A1 * | 3/2020 | Sequeira ................ | G06N 20/00 |
| 2021/0358065 A1 * | 11/2021 | Aguilar Achiaga ........................ | G06Q 10/063112 |
| 2022/0058562 A1 * | 2/2022 | Swaminathan ......... | G06F 40/40 |
| 2022/0198366 A1 * | 6/2022 | Narayanaswamy ... | G06Q 50/01 |

OTHER PUBLICATIONS

Chapter 2—Extraordinary Ability, https://www.uscis.gov/policy-manual/volume6-part-f-chapter-2.
Policy Memorandum, Dec. 22, 2010, PM-602-0005.1, https://www.nafsa.org/sites/default/files/media/document/USCIS2010KazarianMemo.pdf.

(Continued)

*Primary Examiner* — William S Brockington, III
(74) *Attorney, Agent, or Firm* — Dhiraj Jindal; PATENT YOGI LLC

(57) ABSTRACT

The present disclosure provides a method of facilitating modeling expertise of individuals. Further, the method may include receiving individual information and analyzing the individual information. Further, the method may include generating an expertise profile of the expertise of the individual using one or more machine learning models based on the analyzing. Further, the expertise profile characterizes the expertise of the individual based on each of a learning state, a progressive experience, and an impact factor. Further, the expertise profile includes a value corresponding to each of the learning state, the progressive experience, and the impact factor. Further, the value includes one of a data stage, an information stage, a skill stage, a knowledge stage, a wisdom stage, and an enlightenment stage. Further, the one or more machine learning models may be trained corresponding, the progressive experience, and the impact factor using individual information.

14 Claims, 19 Drawing Sheets

(56) References Cited

OTHER PUBLICATIONS

Appeal from the United States District Court for the Central District of California Manuel L. Real, District Judge, Presiding, No. 07-56774 D.C. No. CV-07-03522-R-E, December 9, 2008—Pasadena, California, https://www.nafsa.org/sites/default/files/ektron/uploadedFiles/kazariandecision.pdf.
Ten Tips for Making Your EB-1/EB-2 1-140 Petition Extraordinary, http://theseltzerfirm.com/immigration-options/eb-1-eb-2/ten-tips-for-making-your-eb-1eb-2-i-140-petition-extraordinary/.
Motion on Administrative Appeals Office Decision, Dec. 11, 2018, http://myattorneyusa.com/storage/upload/files/matters/matter-of-h-t-dec-11-2018.pdf.
Appendix 1: Suggested evidentiary standards for AI professionals seeking EB-1A status, https://nyujlpp.org/wp-content/uploads/2021/04/AI-immigration-pathway-tables-4.pdf.
Policy Manual, https://www.aila.org/files/o-files/view-file/648FD5B7-8BE8-40B8-8769-388B096F13B5.
When to Use Comparable Evidence in EB-1A cases, https://www.yaolawgroup.com/when-to-use-comparable-evidence-in-eb-1a-cases/.
Policy Alert, Mar. 23, 2022, PA-2022-12, https://www.uscis.gov/sites/default/files/document/policy-manual-updates/20220323-ExtraordinaryAbility.pdf.
Facebook Fellowship Program 2023 | Fully Funded, https://scholarshipscorner.website/facebook-fellowship-program/.
Employment-Based Immigration: First Preference EB-1, https://www.uscis.gov/working-in-the-united-states/permanent-workers/employment-based-immigration-first-preference-eb-1.
NOU20 CS04, 2 Data, Information, Knowledge and Wisdom, Jul. 14, 2020, https://www.youtube.com/watch?v=sWamkGQKpLM.

\* cited by examiner

SYSTEMS AND METHODS OF FACILITATING MODELING EXPERTISE OF INDIVIDUALS

FIELD OF DISCLOSURE

The present invention relates generally to data processing. More specifically, the present invention is systems and methods of facilitating modeling expertise of individuals.

BACKGROUND

The field of data processing is technologically important to several industries, business organizations, and/or individuals.

Employment-Based Immigration: First Preference (EB-1A) viz. Extraordinary Ability Green Card offers a special Lawful Permanent Residency (LPR) status in the United States of America (USA) for professionals who are particularly gifted in a certain industry. This kind of green card goes to professionals whose abilities are considered to be extraordinary in the fields of athletics, education, science, art, and business.

Further, an individual needs to establish that their ability is of extraordinary heights and has risen to the top of their field of expertise to apply and obtain the special Lawful Permanent Residency (LPR) status in the USA under EB-1A. Anything from awards to high salaries in comparison to other professionals can prove that the individual is worthy of receiving the highly coveted green card.

Existing techniques of facilitating modeling expertise of individuals are deficient with regard to several aspects. For instance, current technologies do not utilize artificial intelligence for generating an individual profile based on individual information (such as competence or expertise in a domain) to facilitate modeling expertise of the individual. Furthermore, current technologies do not provide recommendations for overcoming the inadequacy in the profile of the individual.

Therefore, there is a need for improved methods and systems of facilitating modeling expertise of individuals that may overcome one or more of the above-mentioned problems and/or limitations.

SUMMARY OF DISCLOSURE

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

The present disclosure provides a method of facilitating modeling expertise of individuals. Further, the method may include receiving, using a communication device, one or more individual information associated with an individual from one or more user devices. Further, the method may include analyzing, using a processing device, the one or more individual information. Further, the method may include generating, using the processing device, an expertise profile of the expertise of the individual using one or more machine learning models based on the analyzing. Further, the expertise profile characterizes the expertise of the individual based on each of a learning state, a progressive experience, and an impact factor. Further, the expertise profile includes a value corresponding to each of the learning state, the progressive experience, and the impact factor. Further, the value corresponding to the learning state includes one of a data stage, an information stage, a skill stage, a knowledge stage, a wisdom stage, and an enlightenment stage. Further, the one or more machine learning models may be trained to provide values corresponding to the learning state, the progressive experience, and the impact factor using individual information. Further, the method may include transmitting, using the communication device, the expertise profile to the one or more user devices. Further, the method may include storing, using a storage device, the one or more individual information and the expertise profile.

The present disclosure provides a system for facilitating modeling expertise of individuals. Further, the system may include a communication device. Further, the communication device may be configured for receiving one or more individual information associated with an individual from one or more user devices. Further, the communication device may be configured for transmitting an expertise profile to the one or more user devices. Further, the system may include a processing device communicatively coupled with the communication device. Further, the processing device may be configured for analyzing the one or more individual information. Further, the processing device may be configured for generating the expertise profile of the expertise of the individual using one or more machine learning models based on the analyzing. Further, the expertise profile characterizes the expertise of the individual based on each of a learning state, a progressive experience, and an impact factor. Further, the expertise profile includes a value corresponding to each of the learning state, the progressive experience, and the impact factor. Further, the value corresponding to the learning state includes one of a data stage, an information stage, a skill stage, a knowledge stage, a wisdom stage, and an enlightenment stage. Further, the one or more machine learning models may be trained to provide values corresponding to the learning state, the progressive experience, and the impact factor using individual information. Further, the system may include a storage device communicatively coupled with the processing device. Further, the storage device may be configured for storing the one or more individual information and the expertise profile.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and subcombinations described in the detailed description.

BRIEF DESCRIPTIONS OF DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAILED DESCRIPTION OF DISCLOSURE

Figure 1:
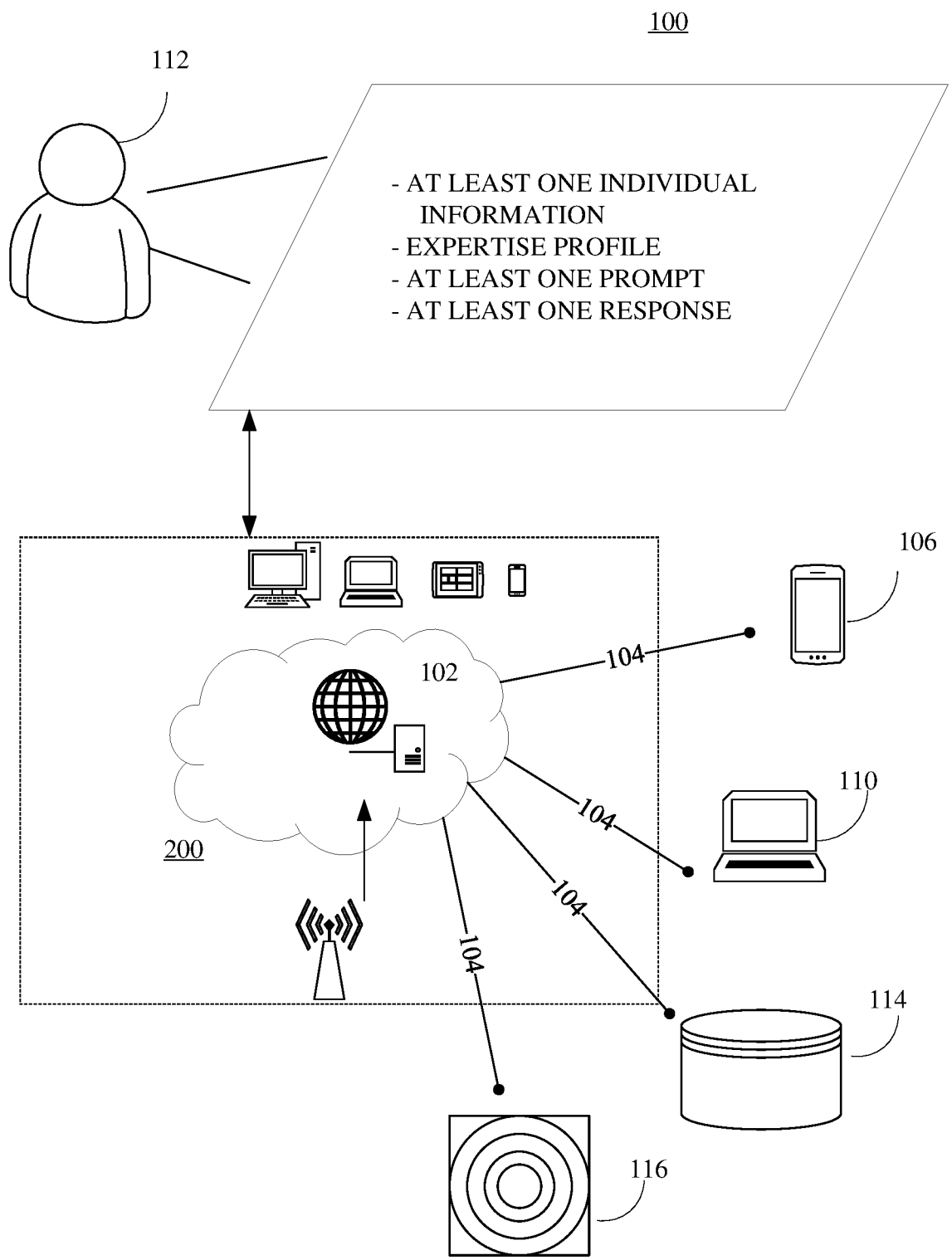
FIG. 1 is an illustration of an online platform 100 consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term-differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of the disclosed use cases, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor and at least one actuator. Examples of the one or more client devices and/or the server computer may include, a desktop computer, a laptop computer, a tablet computer, a personal digital assistant, a portable electronic device, a wearable computer, a smart phone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server etc.), a quantum computer, and so on. Further, one or more client devices and/or the server computer may be configured for executing a software application such as, for example, but not limited to, an operating system (e.g., Windows, Mac OS, Unix, Linux, Android, etc.) in order to provide a user interface (e.g., GUI, touch-screen based interface, voice based interface, gesture based interface etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, public database, a private database and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role based access control, and so on.

Further, one or more steps of the method disclosed herein may be initiated, maintained, controlled and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g. username, password, passphrase, PIN, secret question, secret answer etc.) and/or possession of a machine readable secret data (e.g. encryption key, decryption key, bar codes, etc.) and/or or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smart-card with an authentication token stored thereupon, etc.). Accordingly, the one or more steps of the method may include communicating (e.g., transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the method may be automatically initiated, maintained and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g., initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview:

The present disclosure describes methods and systems of facilitating modeling expertise of individuals.

Further, the present disclosure describes an assessment Model to evaluate a degree of expertise to qualify to apply for an Extraordinary Ability Green Card viz. EB-1A green card (employment-based green card) viz. EB-1A visa in the United States of America (USA).

Further, the present disclosure describes a Data, Information, Skill, Knowledge, Wisdom, and Enlightenment (DISK-WE) matrix and a four Step Define, Organize, Nurture, and Expand (D.O.N.E.) process. Further, the DISK-WE matrix assesses a person's level and degree of expertise.

Further, the present disclosure describes a solution that includes an assessment of the Degree of Expertise of an individual using the DISK-WE Matrix, with 5-Pillars of Expertise. Further, the solution helps the individual achieve an extraordinary ability (EB-1A) green card. Further, the solution includes the usage of the Four Step D.O.N.E. process for fulfilling the gaps in the high degree of expertise as warranted by the EB-1A Green Card Regulations.

Further, the present disclosure describes a program (software application) that may take the individual through the proven four-step process (D.O.N.E process) to get the EB-1A green card. Further, the first step of the four Step D.O.N.E. process may be the Define step. Further, during the Define step the individual's expertise is defined and identified. Further, the individual's expertise is defined by a specialization, which makes the individual stand out in the crowd, since assessing the individual's specialization based on whether this specialization would produce success in the EB-1A green card application or failure, is not easy. Further, the individual's application for the EB-1A green card with the incorrect choice of expertise may most likely not get approved. Further, during this step, the individual is helped in identifying their specialization that will establish their credentials. Further, the individuals are also helped in evaluating the precedence of their expertise from the past EB-1A green card cases.

Further, step two of the four Step D.O.N.E. process may be the Organize step. Further, in this step, an action plan for the individual is organized based on which United States Citizenship and Immigration Services (USCIS) criteria are required to be fulfilled by the individual. Further, the United States Citizenship and Immigration Services is a government agency. Further, the individual may need to create Key Performance Indicators (KPIs) and metrics of their own for success to fulfill the USCIS criteria.

Further, step three of the four Step D.O.N.E. process may be the Nurture step. Further, conventionally, what most people do is merely try to fill in the gaps of the EB-1A green card application, like writing Research Papers, pushing for citations, looking for publications for profiling, and seeking some awards. On the contrary, the best approach for filling in the gaps in the EB-1A green card application is to follow a process in which the individual may first become an authority and then create an outreach. Further, established professionals may also need guidance and support to fill in the gaps in their EB-1A green card applications. Further, during this step, the individual is trained to use tools and techniques to contribute to the 'body of knowledge' in the expertise of the individual and build an individual brand persona. Further, in this step, the individual is hand-held and helped in becoming an author, a founder of an establishment, and creating a patent over a period of 3-4 months that helps the individual in building their EB-1A green card success story.

Further, the fourth step of the four Step D.O.N.E. process may be the Expand step. Further, conventionally, the individual may err by preparing an EB-1A green card application to the USCIS which says that the individual has fulfilled 3 or 4 out of the given 10 criteria, and sending some documents with some Reference Letters to the USCIS. Further, during this step, the individual is taught the correct method to submit their case for the EB-1A green card with suitable recommendation letters to the USCIS. Further, during this step, the individual is helped in developing relationships with experts, who could be potential referees for the individual even if the individual does not have connections in a network.

Further, in an embodiment, the present disclosure describes a scientific process towards profile enhancement and knowledge building that may enable the individual to create outreach enabling one as effective profiling oriented towards EB1A Green Card (extraordinary ability green card), higher job profile, and/or enhancement of income.

Further, the present disclosure describes 4 steps to becoming an expert in applying for EB-1A green card which may include the Define step, the Organize step, the Nurture step, and the Execute.

Further, the Define step may include identifying three (3) dimensions of the individual's expertise and establishing five (5) pillars of the individual's expertise. Further, the three dimensions of the individual's expertise may include Progressive Experience, Learning Continuum, and Impact Factor. Further, the progressive experience is indicated in Years, the learning continuum is indicated in Learning stages (Data, Information, Skill, Knowledge, and Wisdom), and the Impact Factor is both qualitative and quantitative. Further, the five pillars of the individual's expertise may include 'body of Knowledge and Associations', 'Influencers and Awards', 'Legal Enforcement and Law', 'Eminent Spokespersons', and 'Media Professionals. Further, the Organize step may include identifying at least three (3)/ten (10) criteria, identifying a roadmap for success in the EB-1A application, and creating a success toolbox. Further, the Nurture step may include becoming an established authority. Further, becoming the established authority may include contributing to the 'body of knowledge' in the expertise of the individual. Further, contributing to the 'body of knowledge' may include becoming an established writer by publishing articles/posts to personal credit with suitable reviews/comments/citations, conducting events as a speaker, scaling up personal engagements to enhance a professional network to have an effective outreach, becoming an established author and demonstrating a strong influencing factor, and applying for suitable awards/Becoming a founder/CEO of an institution, and/or having a Patent in your field of expertise thus creating a strong impact. Further, to become the established authority the individual may build an individual brand persona. Further, the Execute step may include creating outreach and making the application for the EB-1A. Further, creating the outreach may include connecting with experts who can serve as the individual's references. Further, the making of the application may include creating a compelling case which includes checking whether the application fulfills 3 out of 10 criteria as prescribed by the USCIS (Prongs satisfied), a determination to be made by the USCIS that the individual in the application meets the requisite level of expertise for the category cumulatively (Totality test), and establishing of the individual's resolve in continuing the work in their field upon coming to the USA.

Further, there are three (3) currencies of Petition for the EB-1A green card, and they are expertise, the individual's submission, and reference letters. Further, there are three (3) currencies of expertise of the individual, and they are a degree of expertise viz. Knowledge/Wisdom (for sciences, business, and education categories) and skills (for art and athletic categories), progressive experience, and impact factor created. In terms of enhancing the individual's degree of expertise from being updated to informed, skilled, knowledgeable, and possessing wisdom, the following five (5) pillars are vital: Body of knowledge, association/awards, influencers/spokesperson, laws/legal aspects, and Public Relation (PR)/media. Further, there are three (3) currencies of submission of the application, and they are 'Burden of Persuasion', 'Evidence Standards', and 'Documentation'. Further, there are three (3) currencies of reference letters, and they are people who work with the individual, people who are professionally associated with the individual, and people who may not know the individual personally, but know the individual by virtue of the work of the individual.

Further, for applying for residency (green card) in the USA under EB-1A, the individual may need to present himself as a subject matter expert. Further, to choose the expertise, the individual may choose a category (in the EB-1A green card application the individual decides their metrics for success) comprising business, education, sciences, arts, and athletics. Further, to choose the expertise, the individual may choose a discipline (the discipline may be a subject that confirms a professional discipline of the individual) comprising Information Technology (IT), finance, management, Human resources (HR), marketing, sales, physics, chemistry, Automobile, etc. Further, to choose the expertise, the individual may choose a field (the field may be the Matter, and the matter is where the individual may have put his resources viz, Time, Money, and Energy) comprising risk management, software (programming, Artificial Intelligence (AI), etc.), hardware, regulation, data science, machine learning, audits, data analysis, networking, data engineering, etc. Further, to choose the expertise, the individual may choose the Expertise (the expertise may be the purpose, and the purpose relates to Industry, sector, or any classification). Further, a niche may include performance testing, DevOps, Cryptocurrency, etc.

Further, a key aspect of the EB-1A green card application is that the individual's expertise which is included in the EB-1A green card application should have the potential to become a field or discipline in the future. And the individual should possibly play a role in making their expertise the field.

Further, for accepting the EB-1A green card application of the individual the USCIS should be convinced that the individual is an expert and the Expertise has a future. Further, the USCIS should also be convinced that the individual will have a role. Further, USCIS should also be convinced that the US may have benefits because of the presence of the individual. Further, elements of presenting the case for the immigration of the individual may include a burden of persuasion, evidence, and documentation.

Further, the present disclosure describes a method for modeling the expertise of individuals for facilitating growth in their careers to achieve their career vision. Further, the method may include receiving information associated with an individual which includes information about the individual, such as their educational background, skillsets, qualification, job title, job description, job position, job responsibility, salary, career vision, etc. Further, the method may include analyzing the information and generating an expertise profile of the expertise of the individual in a career using a machine learning model. Further, the expertise profile indicates the position of the individual with respect to the carrier vision. Further, the expertise profile uses a learning state, a progressive experience, and an impact factor for indicating the position of the individual with respect to the career vision. Further, the expertise profile is used to determine the standing of the individual on stages (data stage, information stage, skill stage, knowledge stage, and wisdom stage) of the learning state. Further, the expertise profile is also used to determine the standing of the individual on a scale of the progressive experience. Further, the expertise profile is used to determine the standing of the individual on a scale of the impact factor. Further, the method may include determining the next step in the individual career that the individual need to achieve to move towards achieving their career vision thus facilitating career growth of the individual. Further, achieving the next step requires the individual to improve their standing on the learning state, the progressive experience, and the impact factor. Further, the method may include generating recommendations for the individual to improve their standing on the learning state, the progressive experience, and the impact factor.

Further, the present disclosure describes a method of facilitating modeling expertise of individuals for improving skill levels of the individuals. Further, the method may include receiving information associated with an individual. Further, the information may include personal information, professional information, educational information, etc. Further, the method may include analyzing the information and generating an expertise profile of the expertise or skill of the individual using a machine learning model. Further, the expertise profile measures the expertise of the individual based on the standing of the individual in a learning state, a progressive experience, and an impact factor. Further, the standing of the individual in the learning state may be one of a data stage, an information stage, a skill stage, a knowledge stage, a wisdom stage, and an enlightenment stage. Further, the method may include determining objectives, aspirations, etc. the individual needs to accomplish such as getting EB-1A green card, getting jobs, etc. by analyzing the information of the individual. Further, the method may include determining the required expertise, which is needed by the individual for accomplishing the objectives, aspirations, etc. Further, the method may include comparing the expertise of the individual which is modeled by the expertise profile and the required expertise. Further, the method may include determining an inadequacy in the expertise profile of the individual that may prevent the individual from accomplishing the objective, aspirations, etc. Further, the inadequacy may include shortcomings, pitfalls, etc. Further, the method may include generating a recommendation for the individual for overcoming the inadequacy. Further, the recommendation may include points, tips, steps, etc. for improving the expertise or the skill levels of the individual. Further, the recommendation may include 'establishing credentials', 'creating personalized KPIs', 'contributing to the body of knowledge', 'building individual brand persona', etc.

FIG. 1 is an illustration of an online platform 100 consistent with various embodiments of the present disclosure. By way of non-limiting example, the online platform 100 may be hosted on a centralized server 102, such as, for example, a cloud computing service. The centralized server 102 may communicate with other network entities, such as, for example, a mobile device 106 (such as a smartphone, a laptop, a tablet computer etc.), other electronic devices 110 (such as desktop computers, server computers etc.), databases 114, and sensors 116 over a communication network 104, such as, but not limited to, the Internet. Further, users of the online platform 100 may include relevant parties such as, but not limited to, end-users, administrators, service providers, service consumers and so on. Accordingly, in some instances, electronic devices operated by the one or more relevant parties may be in communication with the platform.

A user 112, such as the one or more relevant parties, may access online platform 100 through a web based software application or browser. The web based software application may be embodied as, for example, but not be limited to, a website, a web application, a desktop application, and a mobile application compatible with a computing device 200.

Figure 2:
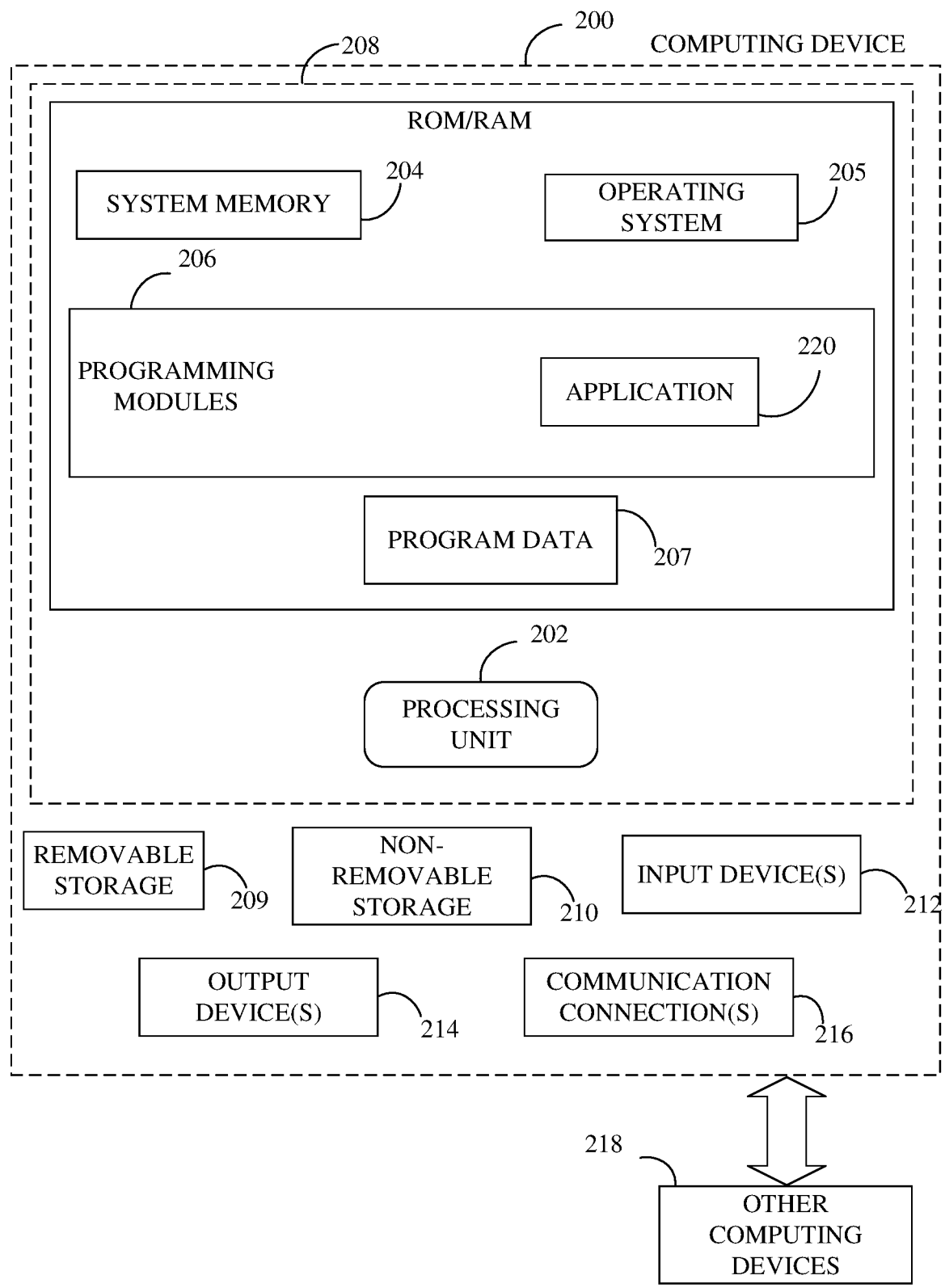
FIG. 2 is a block diagram of a computing device 200 for implementing the methods disclosed herein, in accordance with some embodiments.

With reference to FIG. 2, a system consistent with an embodiment of the disclosure may include a computing device or cloud service, such as computing device 200. In a basic configuration, computing device 200 may include at least one processing unit 202 and a system memory 204. Depending on the configuration and type of computing device, system memory 204 may comprise, but is not limited to, volatile (e.g., random-access memory (RAM)), non-volatile (e.g., read-only memory (ROM)), flash memory, or any combination. System memory 204 may include operating system 205, one or more programming modules 206, and may include a program data 207. Operating system 205, for example, may be suitable for controlling computing device 200's operation. In one embodiment, programming modules 206 may include image-processing module, machine learning module. Furthermore, embodiments of the disclosure may be practiced in conjunction with a graphics library, other operating systems, or any other application program and is not limited to any particular application or system. This basic configuration is illustrated in FIG. 2 by those components within a dashed line 208.

Computing device 200 may have additional features or functionality. For example, computing device 200 may also include additional data storage devices (removable and/or non-removable) such as, for example, magnetic disks, optical disks, or tape. Such additional storage is illustrated in FIG. 2 by a removable storage 209 and a non-removable storage 210. Computer storage media may include volatile and non-volatile, removable and non-removable media implemented in any method or technology for storage of information, such as computer-readable instructions, data structures, program modules, or other data. System memory 204, removable storage 209, and non-removable storage 210 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 200. Any such computer storage media may be part of device 200. Computing device 200 may also have input device(s) 212 such as a keyboard, a mouse, a pen, a sound input device, a touch input device, a location sensor, a camera, a biometric sensor, etc. Output device(s) 214 such as a display, speakers, a printer, etc. may also be included. The aforementioned devices are examples and others may be used.

Computing device 200 may also contain a communication connection 216 that may allow device 200 to communicate with other computing devices 218, such as over a network in a distributed computing environment, for example, an intranet or the Internet. Communication connection 216 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 204, including operating system 205. While executing on processing unit 202, programming modules 206 (e.g., application 220 such as a media player) may perform processes including, for example, one or more stages of methods, algorithms, systems, applications, servers, databases as described above. The aforementioned process is an example, and processing unit 202 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Figure 3A:
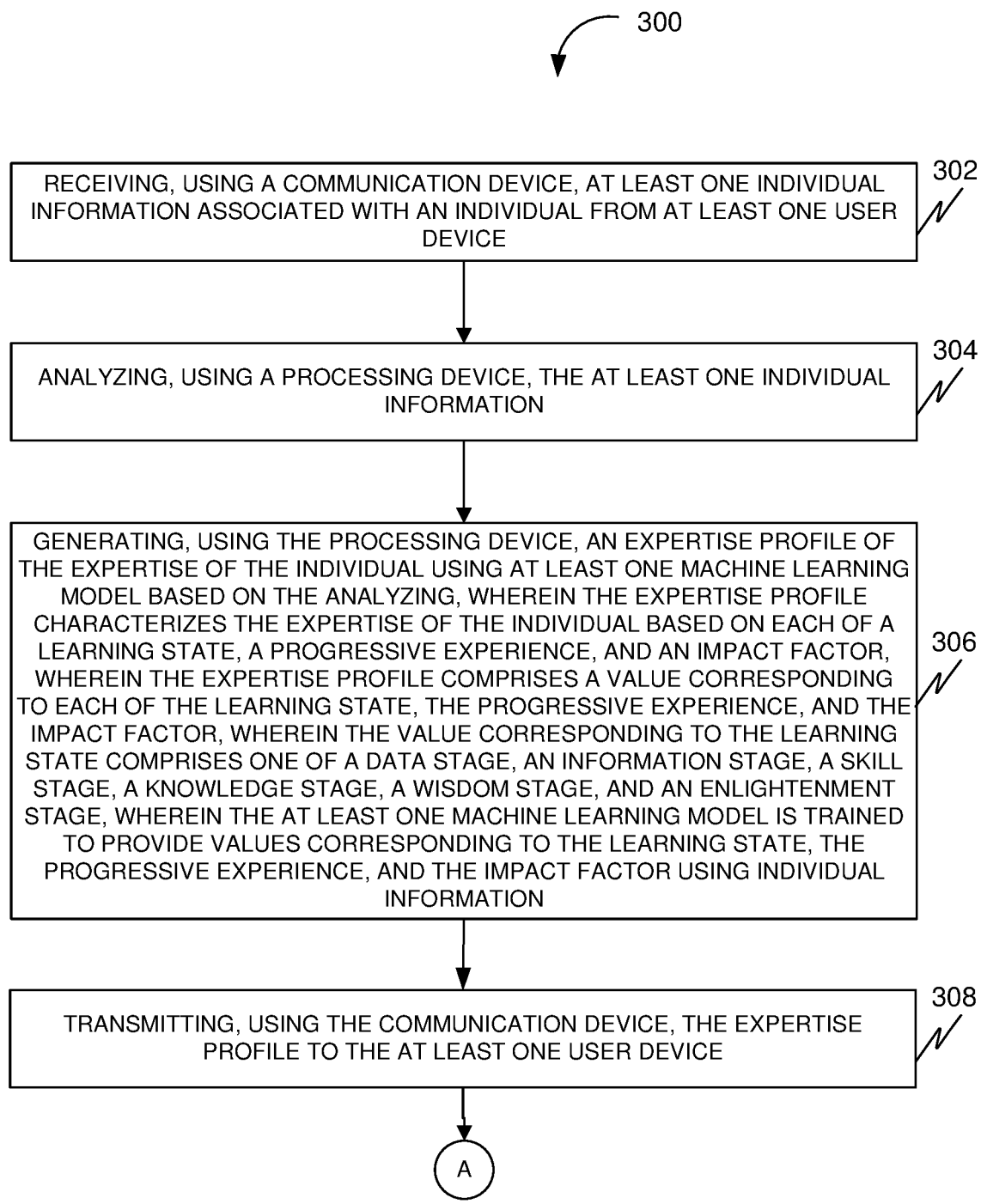
FIG. 3A illustrates a flowchart of a method 300 of facilitating modeling expertise of individuals, in accordance with some embodiments.
Figure 3B:
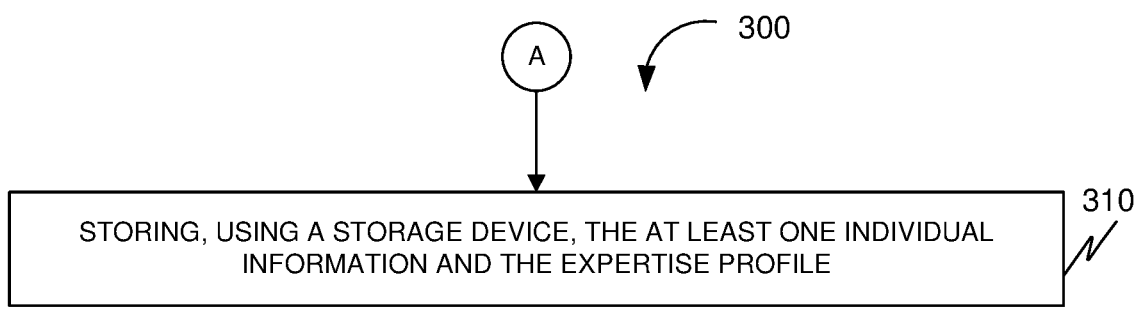
FIG. 3B illustrates a continuation of the flowchart of the method 300 of facilitating modeling expertise of individuals, in accordance with some embodiments.

FIG. 3A and FIG. 3B illustrate a flowchart of a method 300 of facilitating modeling expertise of individuals, in accordance with some embodiments.

Accordingly, the method 300 may include a step 302 of receiving, using a communication device 1102, one or more individual information associated with an individual from one or more user devices. Further, the one or more individual information may include personal information, professional information, financial information, educational information, social information, etc. Further, the one or more user devices may include a computing device, a client device, etc. Further, the method 300 may include a step 304 of analyzing, using a processing device 1104, the one or more individual information. Further, the method 300 may include a step 306 of generating, using the processing device 1104, an expertise profile of the expertise of the individual using one or more machine learning models based on the analyzing. Further, the expertise may be a skill level of the individual in one or more skills. Further, the expertise profile characterizes the expertise of the individual based on each of a learning state (learning continuum), a progressive experience, and an impact factor. Further, the expertise profile includes a value corresponding to each of the learning state, the progressive experience, and the impact factor. Further, the value may be at least one of a qualitative and a quantitative assessment of each of the learning state, the progressive experience, and the impact factor. Further, each of the learning state, the progressive experience, and the impact factor may be variables to characterize the expertise of the individual. Further, the value corresponding to the learning state includes one of a data stage, an information stage, a skill stage, a knowledge stage, a wisdom stage, and an enlightenment stage. Further, the one or more machine learning models may be trained to provide values corresponding to the learning state, the progressive experience, and the impact factor using individual information. Further, the method 300 may include a step 308 of transmitting, using the communication device 1102, the expertise profile to the one or more user devices. Further, the method 300 may include a step 310 of storing, using a storage device 1106, the one or more individual information and the expertise profile.

In some embodiments, the storing further includes storing the one or more individual information and the expertise profile of the individual in a distributed ledger.

Figure 4:
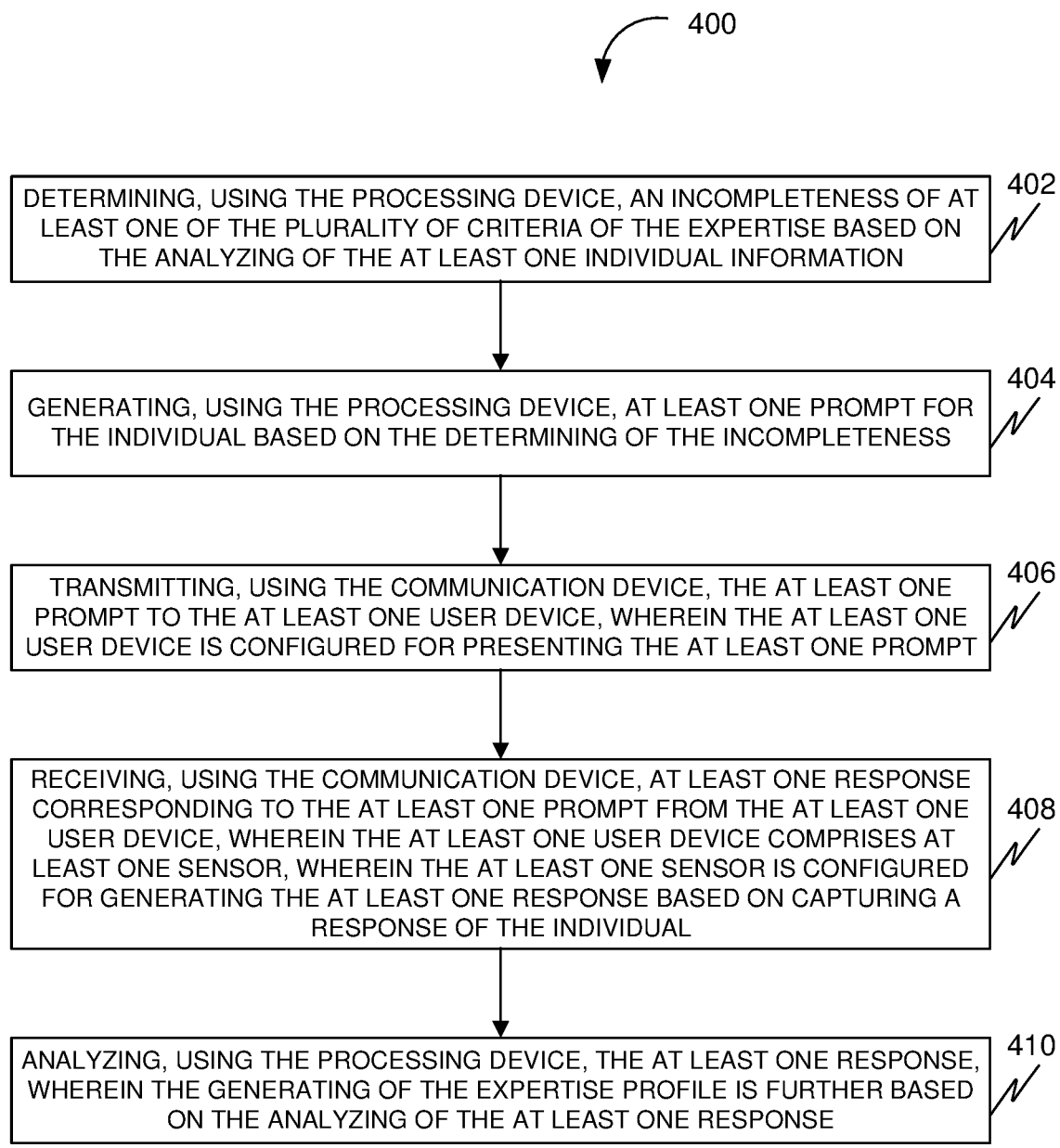
FIG. 4 illustrates a flowchart of a method 400 of facilitating modeling expertise of individuals including analyzing, using the processing device 1104, the at least one response, in accordance with some embodiments.

FIG. 4 illustrates a flowchart of a method 400 of facilitating modeling expertise of individuals including analyzing, using the processing device 1104, the at least one response, in accordance with some embodiments.

Further, in some embodiments, the analyzing may include analyzing the one or more individual information using two or more criteria of the expertise. Further, the two or more criteria of the expertise may include 'body of Knowledge and Associations', 'Influencers and Awards', 'Legal Enforcement and Law', 'Eminent Spokespersons', and 'Media Professionals. Further, the method 400 may include a step 402 of determining, using the processing device 1104, an incompleteness of one or more of the two or more criteria of the expertise based on the analyzing of the one or more individual information. Further, the incompleteness corresponds to a lack of information, competence, skill, etc in the two or more criteria. Further, the determining of the incompleteness may include determining a degree of the incompleteness of one or more of the two or more criteria of the expertise based on the analyzing of the one or more individual information. Further, the method 400 may include a step 404 of generating, using the processing device 1104, one or more prompts for the individual based on the determining of the incompleteness. Further, the one or more prompts may include textual prompts, audio prompts, video prompt, graphical prompts, etc corresponding to questions, clarifications, etc. Further, the method 400 may include a step 406 of transmitting, using the communication device 1102, the one or more prompts to the one or more user devices. Further, the one or more user devices may be configured for presenting the one or more prompts. Further, the one or more user devices may include output devices. Further, the method 400 may include a step 408 of receiving, using the communication device 1102, one or more responses corresponding to the one or more prompts from the one or more user devices. Further, the one or more user devices include one or more sensors. Further, the one or more sensors may be configured for generating the one or more responses based on capturing a response from the individual. Further, the response may include a gesture, a speech, an hand-drawn illustration, a handwritten text, etc. Further, the one or more sensors may include a camera, a microphone, a motion sensor, etc. Further, the method 400 may include a step 410 of analyzing, using the processing device 1104, the one or more responses. Further, the generating of the expertise profile may be based on the analyzing of the one or more responses.

Figure 5:
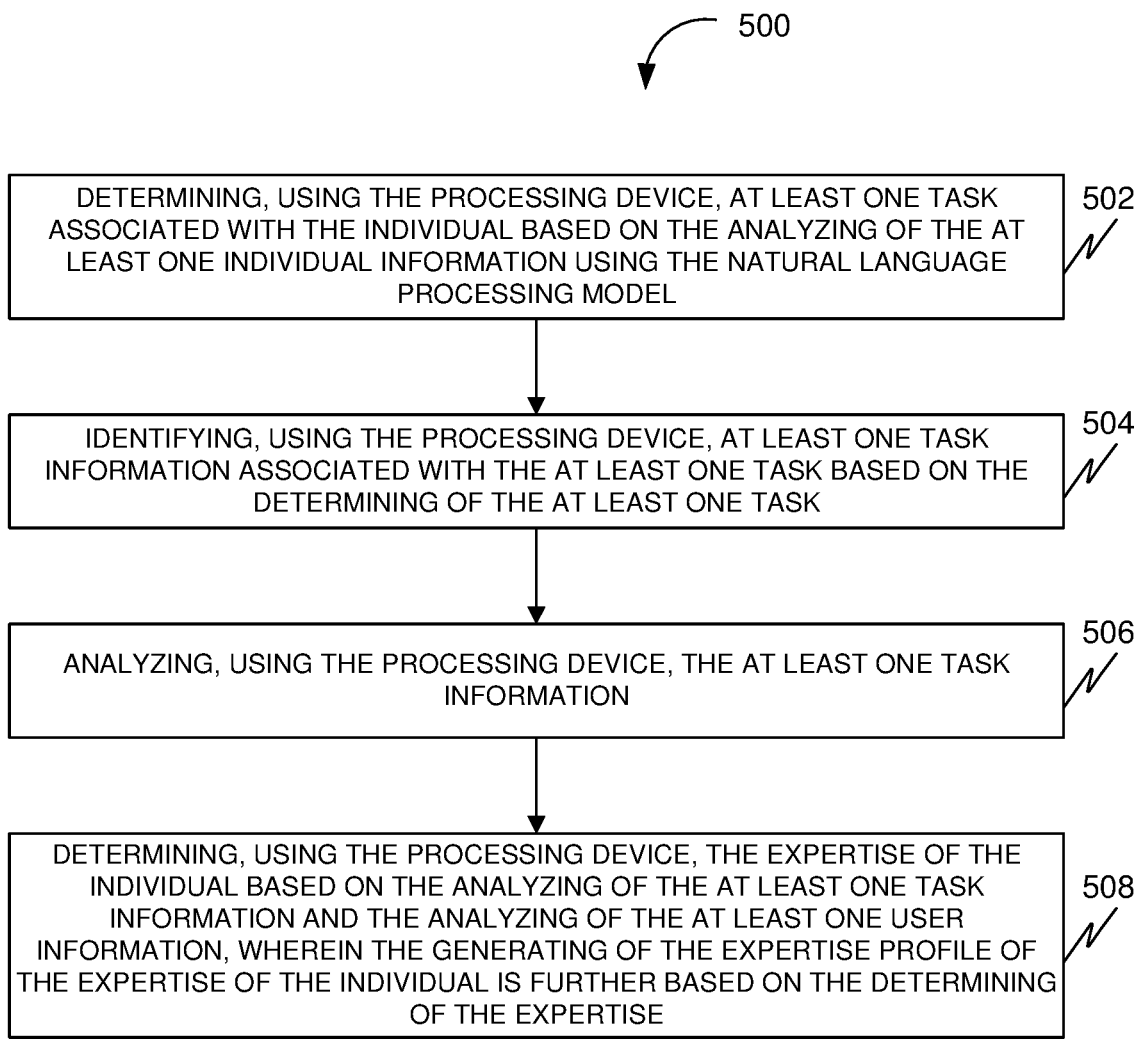
FIG. 5 illustrates a flowchart of a method 500 of facilitating modeling expertise of individuals including determining, using the processing device 1104, the expertise of the individual, in accordance with some embodiments.

FIG. 5 illustrates a flowchart of a method 500 of facilitating modeling expertise of individuals including determining, using the processing device 1104, the expertise of the individual, in accordance with some embodiments.

Further, in some embodiments, the analyzing may include analyzing the one or more individual information using a natural language processing model. Further, the one or more individual information may include natural language speech, natural language text, etc. Further, the natural language processing model may include a natural language understanding model for understanding the natural language speech, natural language text, etc. Further, the method 500 may include a step 502 of determining, using the processing device 1104, one or more tasks associated with the individual based on the analyzing of the one or more individual information using the natural language processing model. Further, the one or more tasks require at least one specific expertise profile. Further, the one or more tasks may include applying for immigration to a country, applying for a job in a company, building a profile, etc. Further, the one or more tasks may include accomplishing objectives, aspirations, etc. of the individual. Further, the method 500 may include a step 504 of identifying, using the processing device 1104, one or more task information associated with the one or more tasks based on the determining of the one or more tasks. Further, a search may be executed on one or more databases associated with at least one of an institution, an organization, an agency (private or government), etc. for identifying the one or more task information. Further, the one or more task information may include rules, regulations, policies, legislations, laws, eligibilities, cutoffs, etc. for the one or more tasks. Further, the method 500 may include a step 506 of analyzing, using the processing device 1104, the one or more task information. Further, the method 500 may include a step 508 of determining, using the processing device 1104, the expertise of the individual based on the analyzing of the one or more task information and the analyzing of the one or more user information. Further, the generating of the expertise profile of the expertise of the individual may be based on the determining of the expertise.

Figure 6:
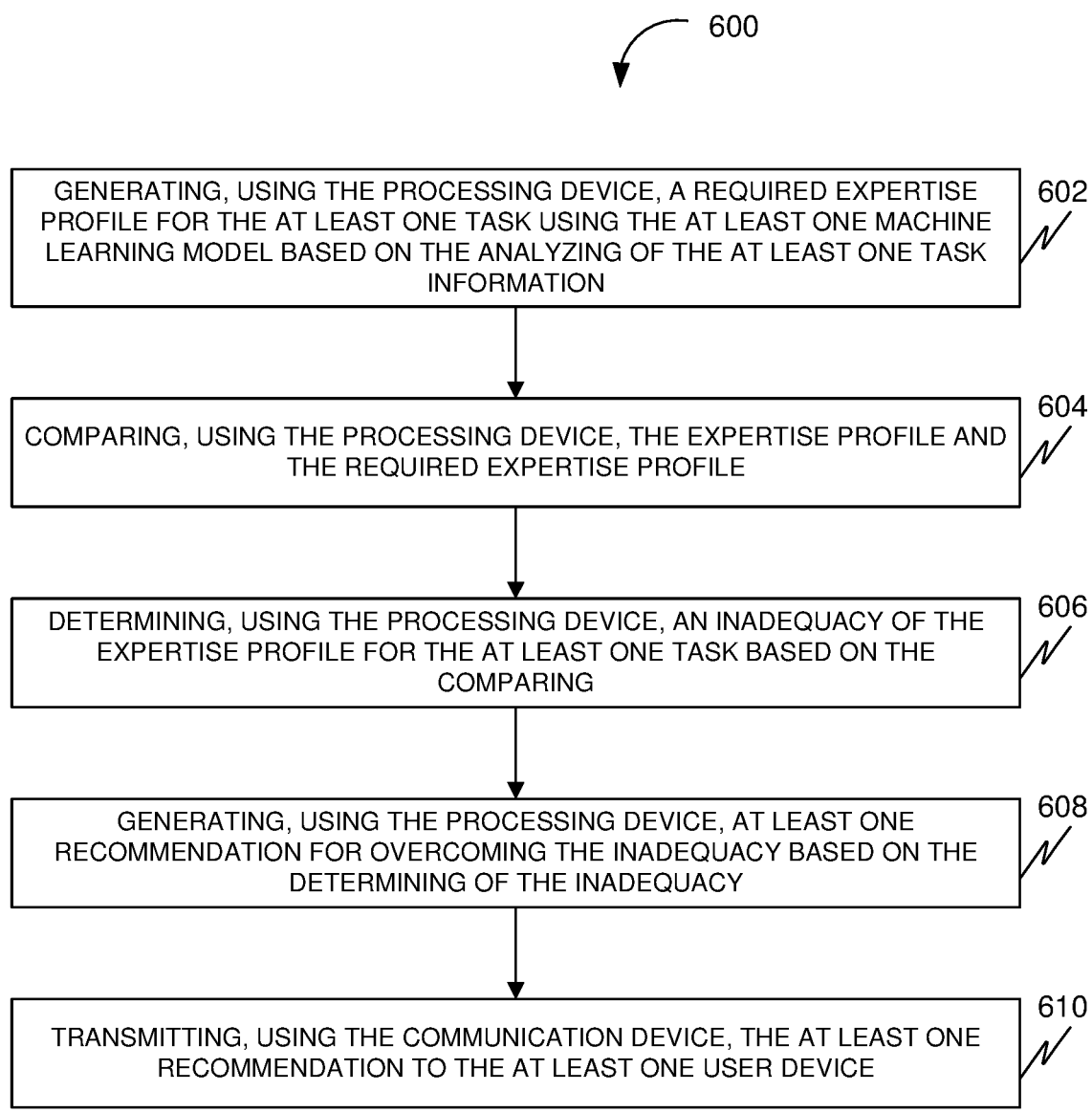
FIG. 6 illustrates a flowchart of a method 600 of facilitating modeling expertise of individuals including generating, using the processing device 1104, at least one recommendation for overcoming the inadequacy, in accordance with some embodiments.

FIG. 6 illustrates a flowchart of a method 600 of facilitating modeling expertise of individuals including generating, using the processing device 1104, at least one recommendation for overcoming the inadequacy, in accordance with some embodiments.

Further, in some embodiments, the method 600 may include a step 602 of generating, using the processing device 1104, a required expertise profile for the one or more tasks using the one or more machine learning models based on the analyzing of the one or more task information. Further, the required expertise profile may an expertise profile that may be acceptable for the one or more tasks. Further, in some embodiments, the method 600 may include a step 604 of comparing, using the processing device 1104, the expertise profile and the required expertise profile. Further, in some embodiments, the method 600 may include a step 606 of determining, using the processing device 1104, an inadequacy of the expertise profile for the one or more tasks based on the comparing. Further, the inadequacy may represent lacking, a shortcoming, failure, etc. of the expertise profile in comparison to the required expertise profile. Further, in some embodiments, the method 600 may include a step 608 of generating, using the processing device 1104, one or more recommendations for overcoming the inadequacy based on the determining of the inadequacy. Further, the one or more recommendations may be suggestions in relation to the expertise of the individual such that the expertise profile of the individual may match the required expertise profile. Further, in some embodiments, the method 600 may include a step 610 of transmitting, using the communication device 1102, the one or more recommendations to the one or more user devices.

Figure 7:
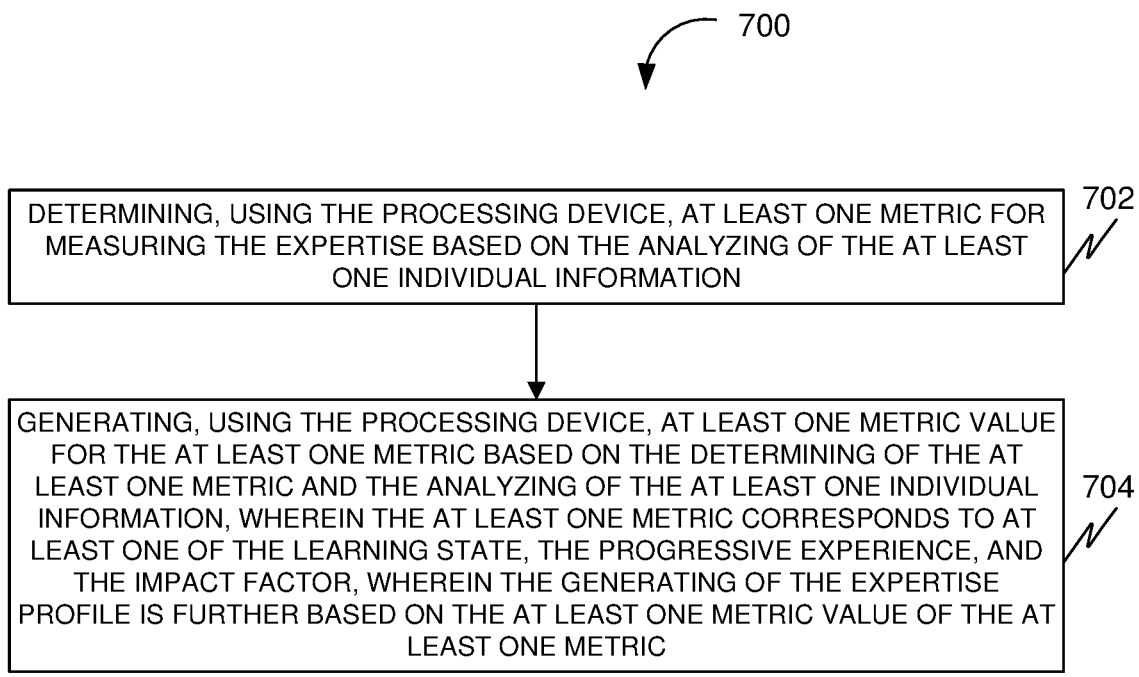
FIG. 7 illustrates a flowchart of a method 700 of facilitating modeling expertise of individuals including generating, using the processing device 1104, at least one metric value for the at least one metric, in accordance with some embodiments.

FIG. 7 illustrates a flowchart of a method 700 of facilitating modeling expertise of individuals including generating, using the processing device 1104, at least one metric value for the at least one metric, in accordance with some embodiments.

Further, in some embodiments, the method 700 may include a step 702 of determining, using the processing device 1104, one or more metrics for measuring the expertise based on the analyzing of the one or more individual information. Further, the one or more metrics may include scientific papers authored, patents held, conferences chaired, degrees or diplomas held, seminars or workshops attended, etc. Further, in some embodiments, the method 700 may include a step 704 of generating, using the processing device 1104, one or more metric values for the one or more metrics based on the determining of the one or more metrics and the analyzing of the one or more individual information. Further, the one or more metric values may be at least one of a qualitative and a quantitative assessment of the one or more metrics. Further, the one or more metrics corresponds to one or more of the learning state, the progressive experience, and the impact factor. Further, the generating of the expertise profile may be based on the one or more metric values of the one or more metrics.

Figure 8:
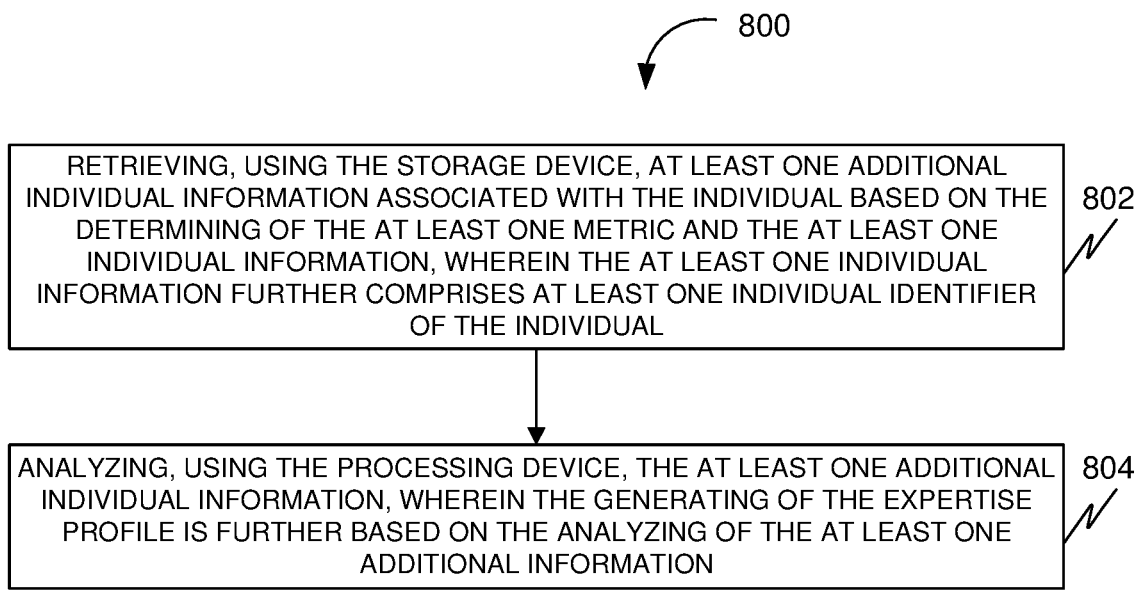
FIG. 8 illustrates a flowchart of a method 800 of facilitating modeling expertise of individuals including analyzing, using the processing device 1104, the at least one additional individual information, in accordance with some embodiments.

FIG. 8 illustrates a flowchart of a method 800 of facilitating modeling expertise of individuals including analyzing, using the processing device 1104, the at least one additional individual information, in accordance with some embodiments.

Further, in some embodiments, the method 800 may include a step 802 of retrieving, using the storage device 1106, one or more additional individual information associated with the individual based on the determining of the one or more metrics and the one or more individual information. Further, the one or more additional individual information may include information of the one or more metrics, information of social peers of the individual, information of professional peers of the individual, information of educational peers of the individual, etc. Further, the one or more individual information includes at least one individual identifier of the individual. Further, the at least one individual identifier may include a name, a biometric, etc. Further, in some embodiments, the method 800 may include a step 804 of analyzing, using the processing device 1104, the one or more additional individual information. Further, the generating of the expertise profile may be based on the analyzing of the one or more additional individual information.

Figure 9A:
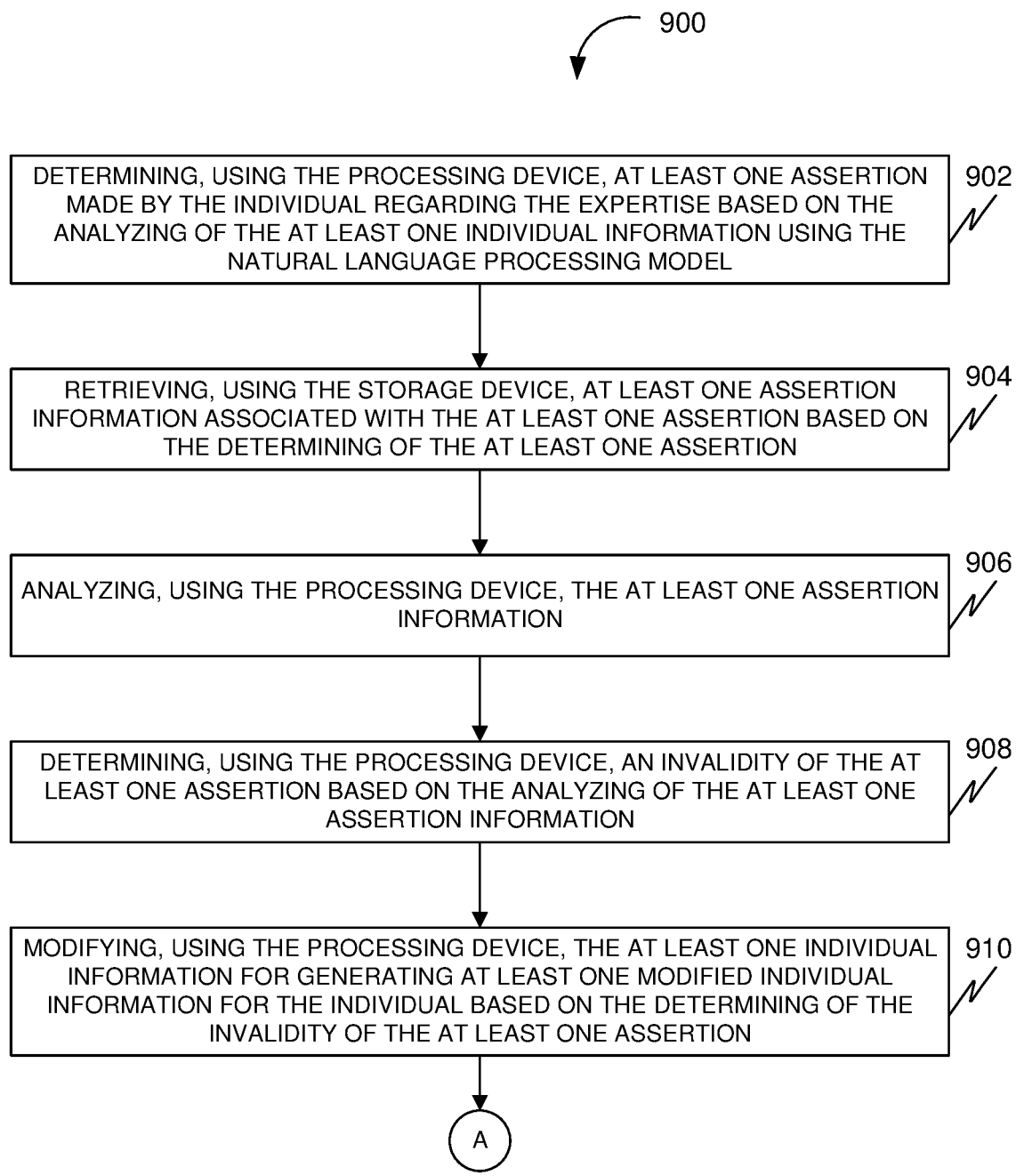
FIG. 9A illustrates a flowchart of a method 900 of facilitating modeling expertise of individuals including analyzing, using the processing device 1104, the at least one modified individual information, in accordance with some embodiments.
Figure 9B:
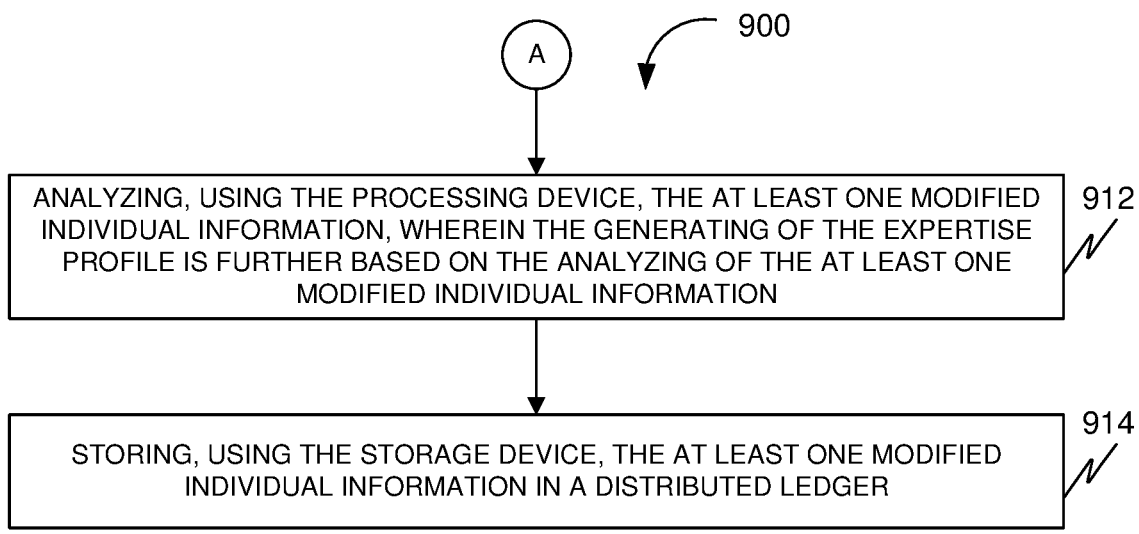
FIG. 9B illustrates a continuation of the flowchart of the method 900 of facilitating modeling expertise of individuals including analyzing, using the processing device 1104, the at least one modified individual information, in accordance with some embodiments.

FIG. 9A and FIG. 9B illustrate a flowchart of a method 900 of facilitating modeling expertise of individuals including analyzing, using the processing device 1104, the at least one modified individual information, in accordance with some embodiments.

Further, in some embodiments, the analyzing may include analyzing the one or more individual information using a natural language processing model. Further, the method 900 may include a step 902 of determining, using the processing device 1104, one or more assertions made by the individual regarding the expertise based on the analyzing of the one or more individual information using the natural language processing model. Further, the one or more assertions may be statements made the individual to specific the expertise of the individual. Further, the method 900 may include a step 904 of retrieving, using the storage device 1106, one or more assertion information associated with the one or more assertions based on the determining of the one or more assertions. Further, the method 900 may include a step 906 of analyzing, using the processing device 1104, the one or more assertion information. Further, the method 900 may include a step 908 of determining, using the processing device 1104, an invalidity of the one or more assertions based on the analyzing of the one or more assertion information. Further, the invalidity corresponds to incorrectness or falsehood in the statements made by the individual. Further, the method 900 may include a step 910 of modifying, using the processing device 1104, the one or more individual information for generating one or more modified individual information for the individual based on the determining of the invalidity of the one or more assertions. Further, the modifying of the one or more individual information modifies the one or more assertions making the one or more assertions verifiably true. Further, the method 900 may include a step 912 of analyzing, using the processing device 1104, the one or more modified individual information. Further, the generating of the expertise profile may be based on the analyzing of the one or more modified individual information. Further, the method 900 may include a step 914 of storing, using the storage device 1106, the one or more modified individual information in a distributed ledger.

Figure 10A:
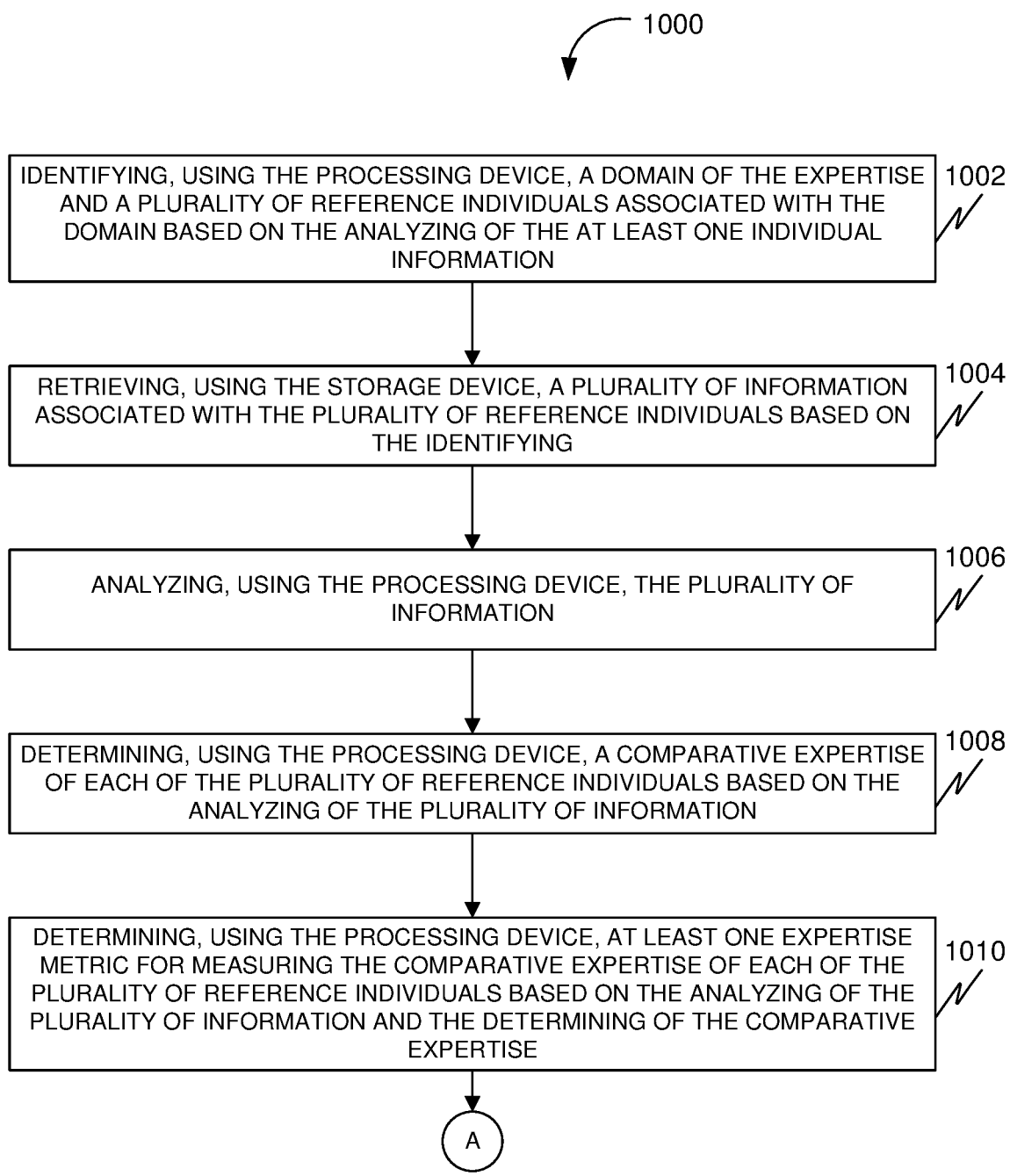
FIG. 10A illustrates a flowchart of a method 1000 of facilitating modeling expertise of individuals including configuring, using the processing device 1104, the at least one machine learning model using the at least one parameter, in accordance with some embodiments.
Figure 10B:
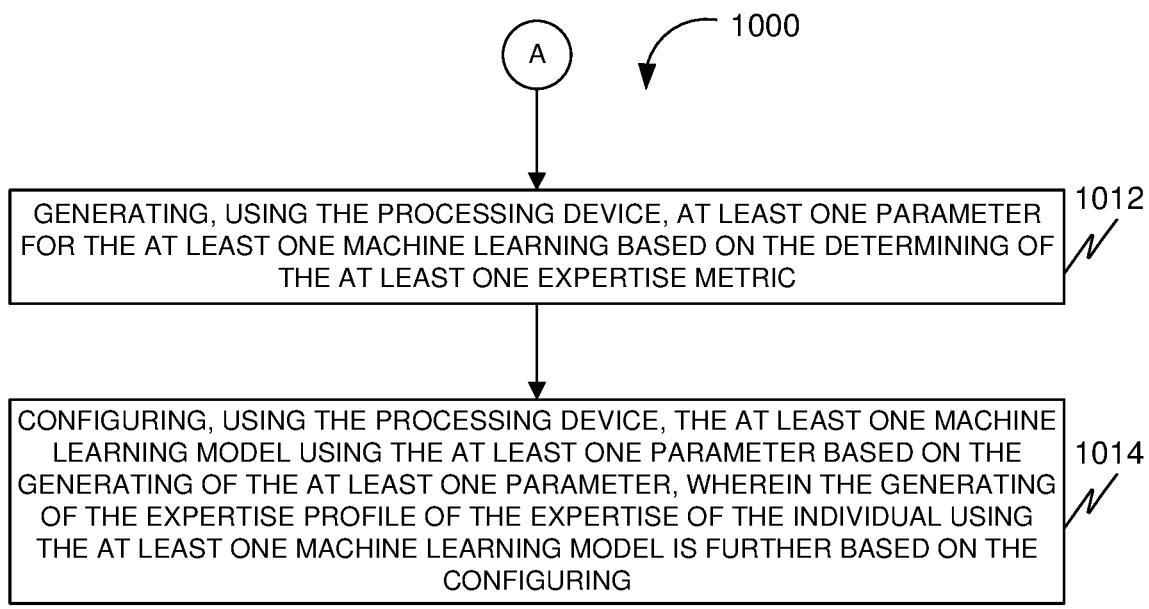
FIG. 10B illustrates a continuation of the flowchart of the method 1000 of facilitating modeling expertise of individuals including configuring, using the processing device 1104, the at least one machine learning model using the at least one parameter, in accordance with some embodiments.

FIG. 10A and FIG. 10B illustrate a flowchart of a method 1000 of facilitating modeling expertise of individuals including configuring, using the processing device 1104, the at least one machine learning model using the at least one parameter, in accordance with some embodiments.

Further, in some embodiments, the method 1000 may include a step 1002 of identifying, using the processing device 1104, a domain of the expertise and two or more reference individuals associated with the domain based on the analyzing of the one or more individual information. Further, the two or more reference individuals may be individuals established in the domain. Further, the domain corresponds to a category, a field, a discipline, etc. of the expertise. Further, the category may include Business, Education, Sciences, Arts, Athletics, etc. Further, the discipline may include Information Technology (IT), Finance, Management, Human Resources (HR), Marketing, Sales, Physics, Chemistry, Automobile, etc. Further, the field may include Risk Management, Software (Programming, Artificial intelligence (AI), etc.), Hardware, Regulation, Data Science, Machine Learning, Audits, Data Analysis, Networking, Data Engineering, etc. Further, in some embodiments, the method 1000 may include a step 1004 of retrieving, using the storage device 1106, two or more information associated with the two or more reference individuals based on the identifying. Further, in some embodiments, the method 1000 may include a step 1006 of analyzing, using the processing device 1104, the two or more information. Further, in some embodiments, the method 1000 may include a step 1008 of determining, using the processing device 1104, a comparative expertise of each of the two or more reference individuals based on the analyzing of the two or more information. Further, the comparative expertise may be the expertise of one reference individual with respect to the other reference individual. Further, in some embodiments, the method 1000 may include a step 1010 of determining, using the processing device 1104, one or more expertise metrics for measuring the comparative expertise of each of the two or more reference individuals based on the analyzing of the two or more information and the determining of the comparative expertise. Further, the one or more expertise metrics qualitatively and quantitatively measure each of the learning state, the progressive experience, and the impact factor for the two or more reference individuals. Further, in some embodiments, the method 1000 may include a step 1012 of generating, using the processing device 1104, one or more parameters for the one or more machine learning models based on the determining of the one or more expertise metrics. Further, the two or more parameters may include variables for tuning machine learning algorithms of the one or more machine learning models. Further, in some embodiments, the method 1000 may include a step 1014 of configuring, using the processing device 1104, the one or more machine learning models using the one or more parameters based on the generating of the one or more parameters. Further, the configuring may include tuning the machine learning algorithms of the one or more machine learning models using the one or more parameters. Further, the generating of the expertise profile of the expertise of the individual using the one or more machine learning models may be based on the configuring.

In some embodiments, the analyzing of the two or more information further includes analyzing the two or more information using one or more first machine learning models. Further, the one or more first machine learning models may be trained for comparing expertise of reference individuals relatively based on information. Further, the generating of the comparative expertise may be based on the analyzing of the two or more information using the one or more first machine learning models.

Figure 11:
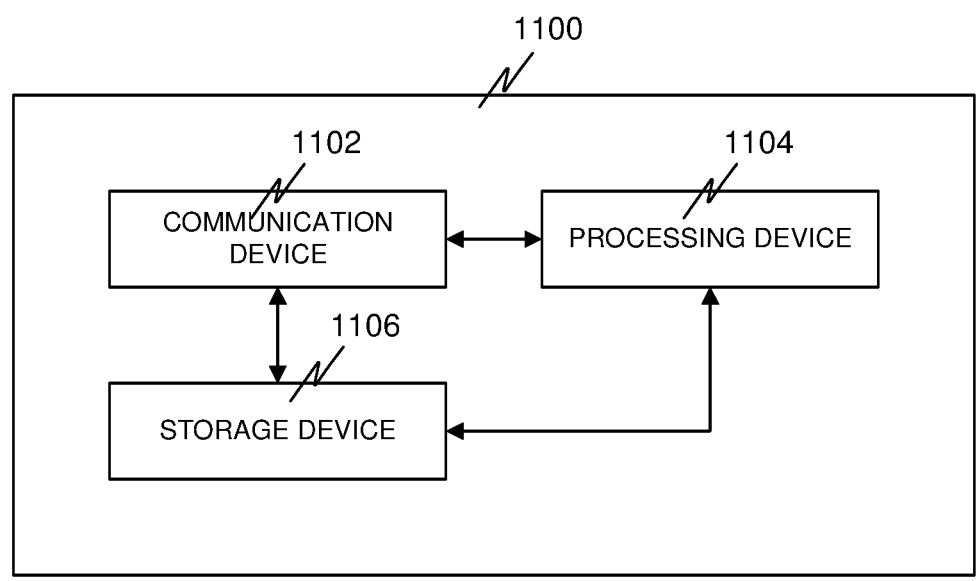
FIG. 11 illustrates a block diagram of a system 1100 of facilitating modeling expertise of individuals, in accordance with some embodiments.

FIG. 11 illustrates a block diagram of a system 1100 of facilitating modeling expertise of individuals, in accordance with some embodiments.

Figure 15:
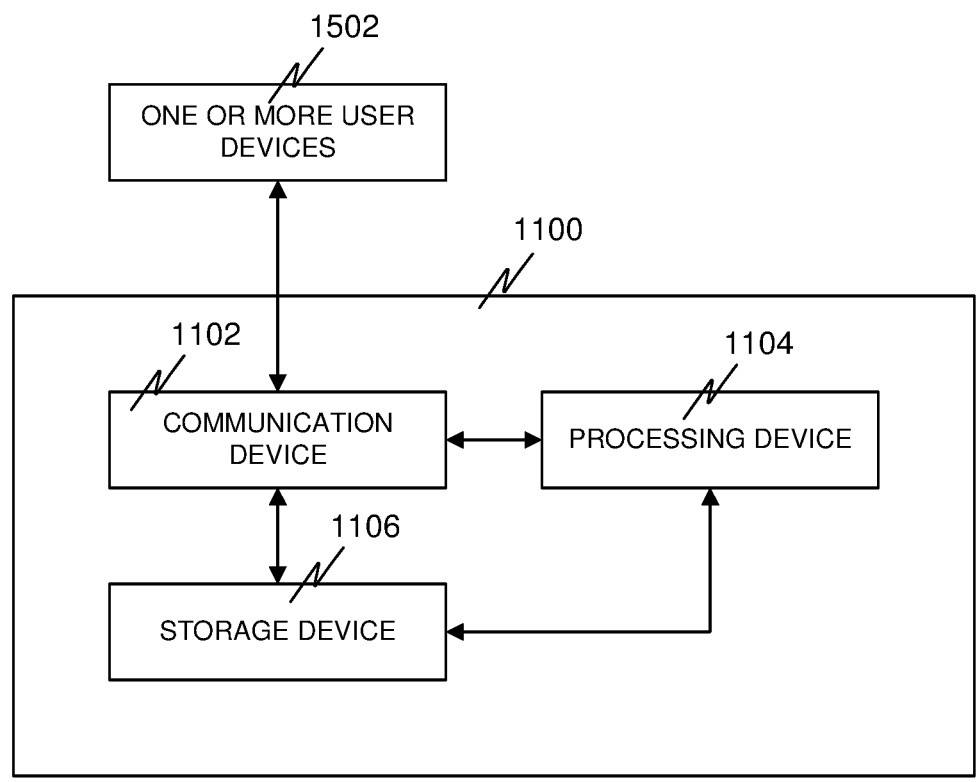
FIG. 15 illustrates a block diagram of the system 1100 of facilitating modeling expertise of individuals, in accordance with some embodiments.

Accordingly, the system 1100 may include a communication device 1102. Further, the communication device 1102 may be configured for receiving one or more individual information associated with an individual from one or more user devices 1502, as shown in FIG. 15. Further, the communication device 1102 may be configured for transmitting an expertise profile to the one or more user devices 1502. Further, the system 1100 may include a processing device 1104 communicatively coupled with the communication device 1102. Further, the processing device 1104 may be configured for analyzing the one or more individual information. Further, the processing device 1104 may be configured for generating the expertise profile of the expertise of the individual using one or more machine learning models based on the analyzing. Further, the expertise profile characterizes the expertise of the individual based on each of a learning state, a progressive experience, and an impact factor. Further, the expertise profile includes a value corresponding to each of the learning state, the progressive experience, and the impact factor. Further, the value corresponding to the learning state includes one of a data stage, an information stage, a skill stage, a knowledge stage, a wisdom stage, and an enlightenment stage. Further, the one or more machine learning models may be trained to provide values corresponding to the learning state, the progressive experience, and the impact factor using individual information. Further, the system 1100 may include a storage device 1106 communicatively coupled with the processing device 1104. Further, the storage device 1106 may be configured for storing the one or more individual information and the expertise profile.

In some embodiments, the storing further includes storing the one or more individual information and the expertise profile of the individual in a distributed ledger.

Figure 16:
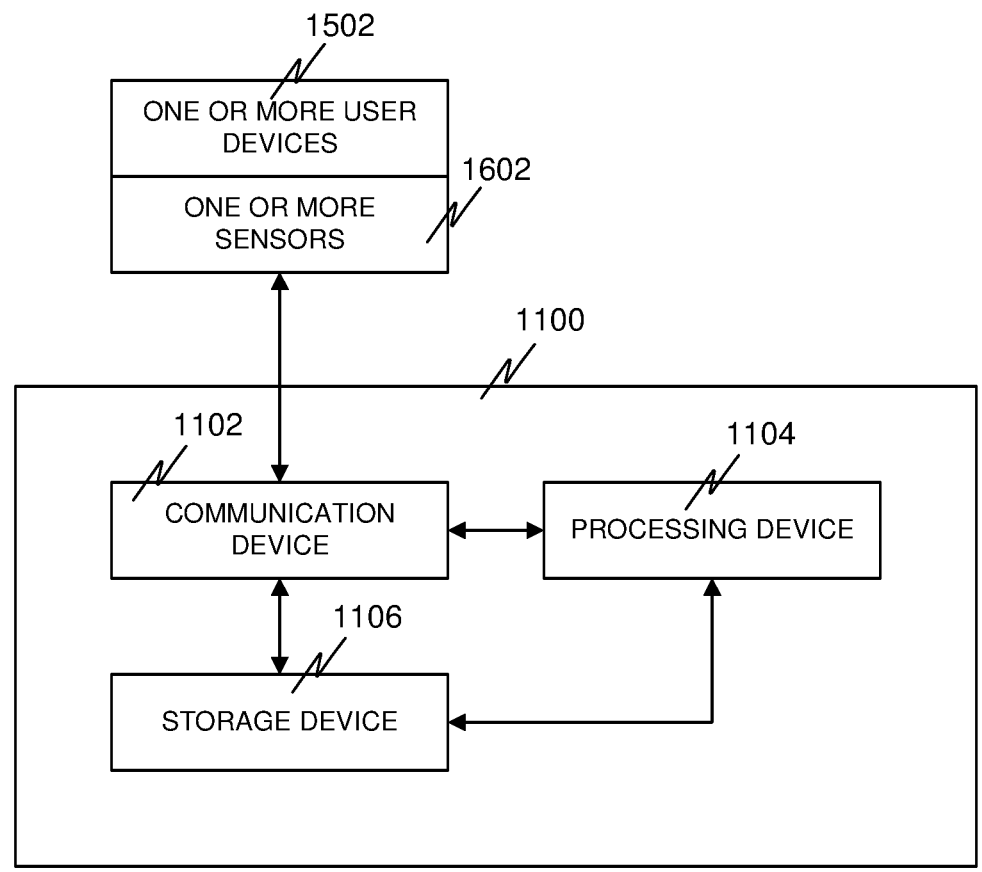
FIG. 16 illustrates a block diagram of the system 1100 of facilitating modeling expertise of individuals, in accordance with some embodiments.

Further, in some embodiments, the analyzing may include analyzing the one or more individual information using two or more criteria of the expertise. Further, the processing device 1104 may be configured for determining an incompleteness of one or more of the two or more criteria of the expertise based on the analyzing of the one or more individual information. Further, the processing device 1104 may be configured for generating one or more prompts for the individual based on the determining of the incompleteness. Further, the processing device 1104 may be configured for analyzing one or more responses. Further, the generating of the expertise profile may be based on the analyzing of the one or more responses. Further, the communication device 1102 may be configured for transmitting the one or more prompts to the one or more user devices 1502. Further, the one or more user devices 1502 may be configured for presenting the one or more prompts. Further, the communication device 1102 may be configured for receiving the one or more responses corresponding to the one or more prompts from the one or more user devices 1502. Further, the one or more user devices 1502 include one or more sensors 1602, as shown in FIG. 16. Further, the one or more sensors 1602 may be configured for generating the one or more responses based on capturing a response from the individual.

Further, in some embodiments, the analyzing may include analyzing the one or more individual information using a natural language processing model. Further, the processing device 1104 may be configured for determining one or more tasks associated with the individual based on the analyzing of the one or more individual information using the natural language processing model. Further, the processing device 1104 may be configured for identifying one or more task information associated with the one or more tasks based on the determining of the one or more tasks. Further, the processing device 1104 may be configured for analyzing the one or more task information. Further, the processing device 1104 may be configured for determining the expertise of the individual based on the analyzing of the one or more task information and the analyzing of the one or more user information. Further, the generating of the expertise profile of the expertise of the individual may be based on the determining of the expertise.

Further, in some embodiments, the processing device 1104 may be configured for generating a required expertise profile for the one or more tasks using the one or more machine learning models based on the analyzing of the one or more task information. Further, the processing device 1104 may be configured for comparing the expertise profile and the required expertise profile. Further, the processing device 1104 may be configured for determining an inadequacy of the expertise profile for the one or more tasks based on the comparing. Further, the processing device 1104 may be configured for generating one or more recommendations for overcoming the inadequacy based on the determining of the inadequacy. Further, the communication device 1102 may be configured for transmitting the one or more recommendations to the one or more user devices 1502.

Further, in some embodiments, the processing device 1104 may be configured for determining one or more metrics for measuring the expertise based on the analyzing of the one or more individual information. Further, the processing device 1104 may be configured for generating one or more metric values for the one or more metrics based on the determining of the one or more metrics and the analyzing of the one or more individual information. Further, the one or more metrics corresponds to one or more of the learning state, the progressive experience, and the impact factor. Further, the generating of the expertise profile may be based on the one or more metric values of the one or more metrics.

In some embodiments, the storage device 1106 may be configured for retrieving one or more additional individual information associated with the individual based on the determining of the one or more metrics and the one or more individual information. Further, the one or more individual information includes at least one individual identifier of the individual. Further, the processing device 1104 may be configured for analyzing the one or more additional individual information. Further, the generating of the expertise profile may be based on the analyzing of the one or more additional individual information.

Further, in some embodiments, the analyzing may include analyzing the one or more individual information using a natural language processing model. Further, the processing device 1104 may be configured for determining one or more assertions made by the individual regarding the expertise based on the analyzing of the one or more individual information using the natural language processing model. Further, the processing device 1104 may be configured for analyzing one or more assertion information. Further, the processing device 1104 may be configured for determining an invalidity of the one or more assertions based on the analyzing of the one or more assertion information. Further, the processing device 1104 may be configured for modifying the one or more individual information for generating one or more modified individual information for the individual based on the determining of the invalidity of the one or more assertions. Further, the processing device 1104 may be configured for analyzing the one or more modified individual information. Further, the generating of the expertise profile may be based on the analyzing of the one or more modified individual information. Further, the storage device 1106 may be configured for retrieving the one or more assertion information associated with the one or more assertions based on the determining of the one or more assertions. Further, the storage device 1106 may be configured for storing the one or more modified individual information in a distributed ledger.

Further, in some embodiments, the processing device 1104 may be configured for identifying a domain of the expertise and two or more reference individuals associated with the domain based on the analyzing of the one or more individual information. Further, the processing device 1104 may be configured for analyzing two or more information. Further, the processing device 1104 may be configured for determining a comparative expertise of each of the two or more reference individuals based on the analyzing of the two or more information. Further, the processing device 1104 may be configured for determining one or more expertise metrics for measuring the comparative expertise of each of the two or more reference individuals based on the analyzing of the two or more information and the determining of the comparative expertise. Further, the processing device 1104 may be configured for generating one or more parameters for the one or more machine learning models based on the determining of the one or more expertise metrics. Further, the processing device 1104 may be configured for configuring the one or more machine learning models using the one or more parameters based on the generating of the one or more parameters. Further, the generating of the expertise profile of the expertise of the individual using the one or more machine learning models may be based on the configuring. Further, the storage device 1106 may be configured for retrieving the two or more information associated with the two or more reference individuals based on the identifying.

In some embodiments, the analyzing of the two or more information includes analyzing the two or more information using one or more first machine learning models. Further, the one or more first machine learning models may be trained for comparing expertise of reference individuals relatively based on information. Further, the generating of the comparative expertise may be based on the analyzing of the plurality of information using the at least one first machine learning model.

Figure 12:
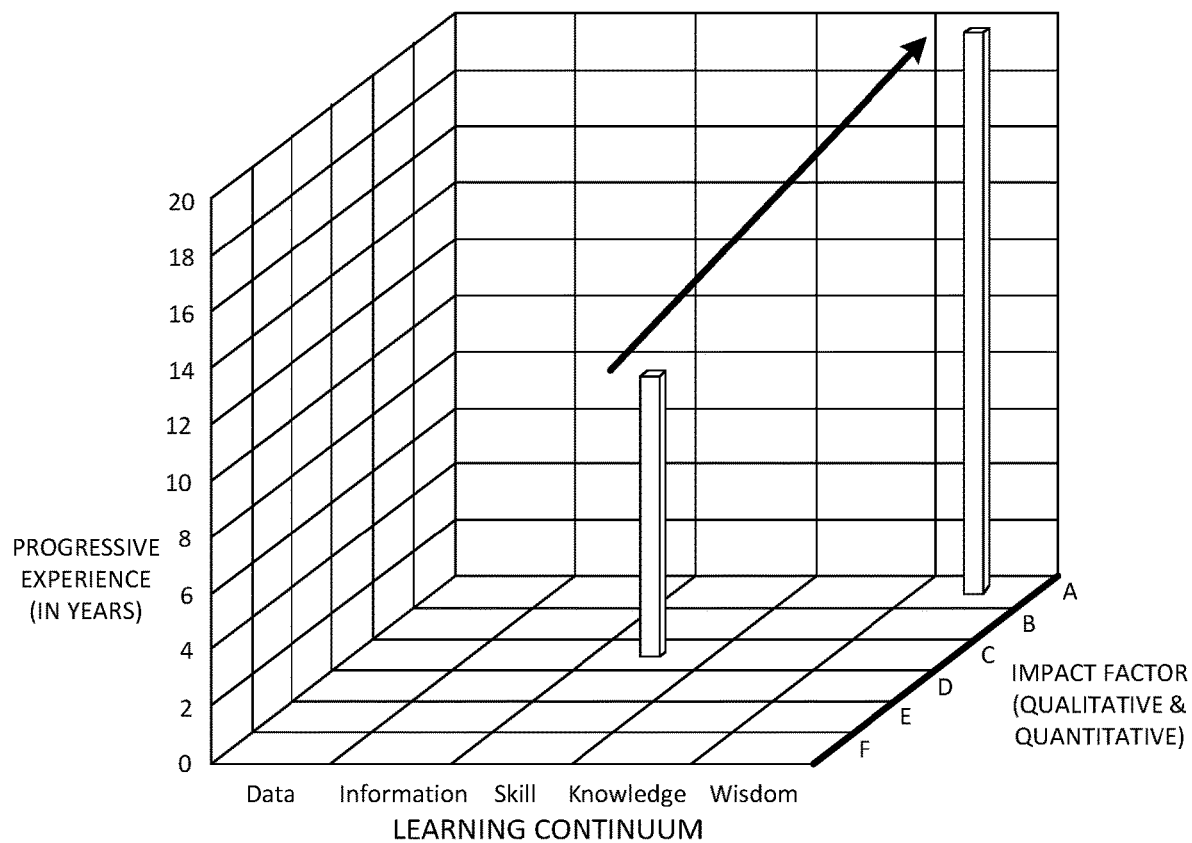
FIG. 12 is a graphical representation of 3 dimensions of the expertise, in accordance with some embodiments.

FIG. 12 is a graphical representation of 3 dimensions of the expertise, in accordance with some embodiments.

Figure 13:
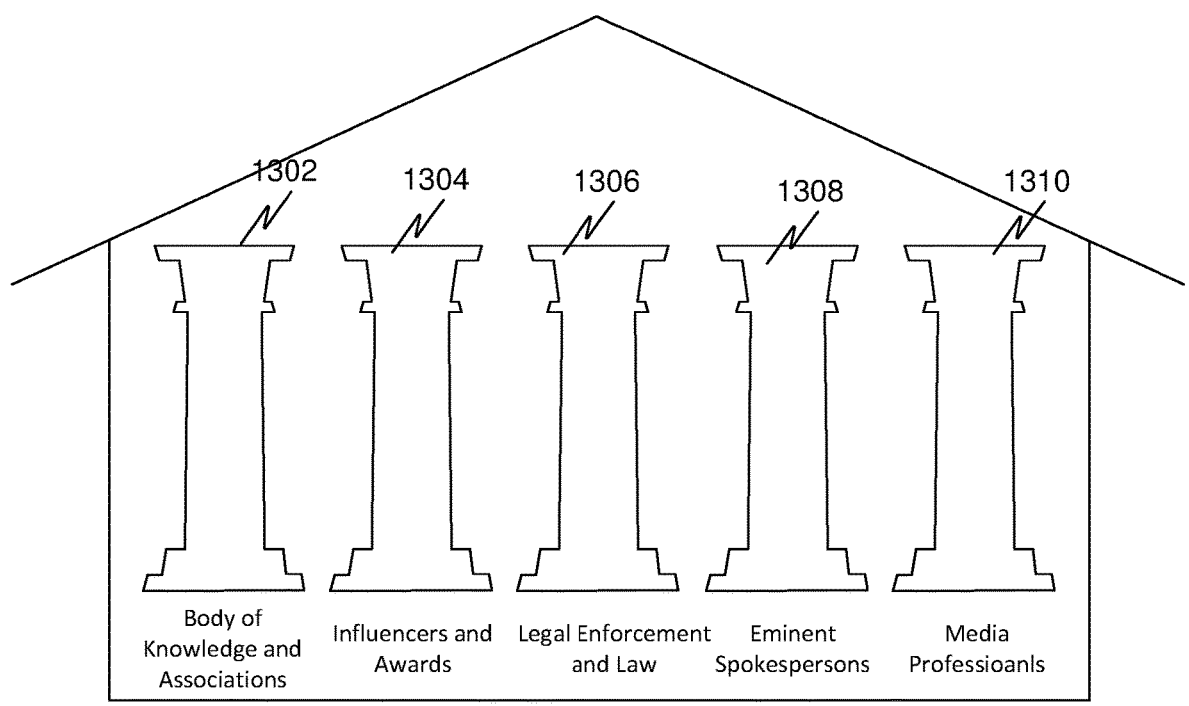
FIG. 13 illustrates 5 pillars (or criteria) 1302-1310 of the expertise associated with the disclosed system, in accordance with some embodiments.

FIG. 13 illustrates 5 pillars (or criteria) 1302-1310 of the expertise associated with the disclosed system, in accordance with some embodiments. Accordingly, a first pillar 1302 of the 5 pillars 1302-1310 may include body of knowledge and associations. Further, a second pillar 1304 of the 5 pillars 1302-1310 may include influencers and awards. Further, a third pillar 1306 of the 5 pillars 1302-1310 may include legal enforcements and law. Further, a fourth pillar 1308 of the 5 pillars 1302-1310 may include eminent spokespersons. Further, a fifth pillar 1310 of the 5 pillars 1302-1310 may include media professionals.

Figure 14:
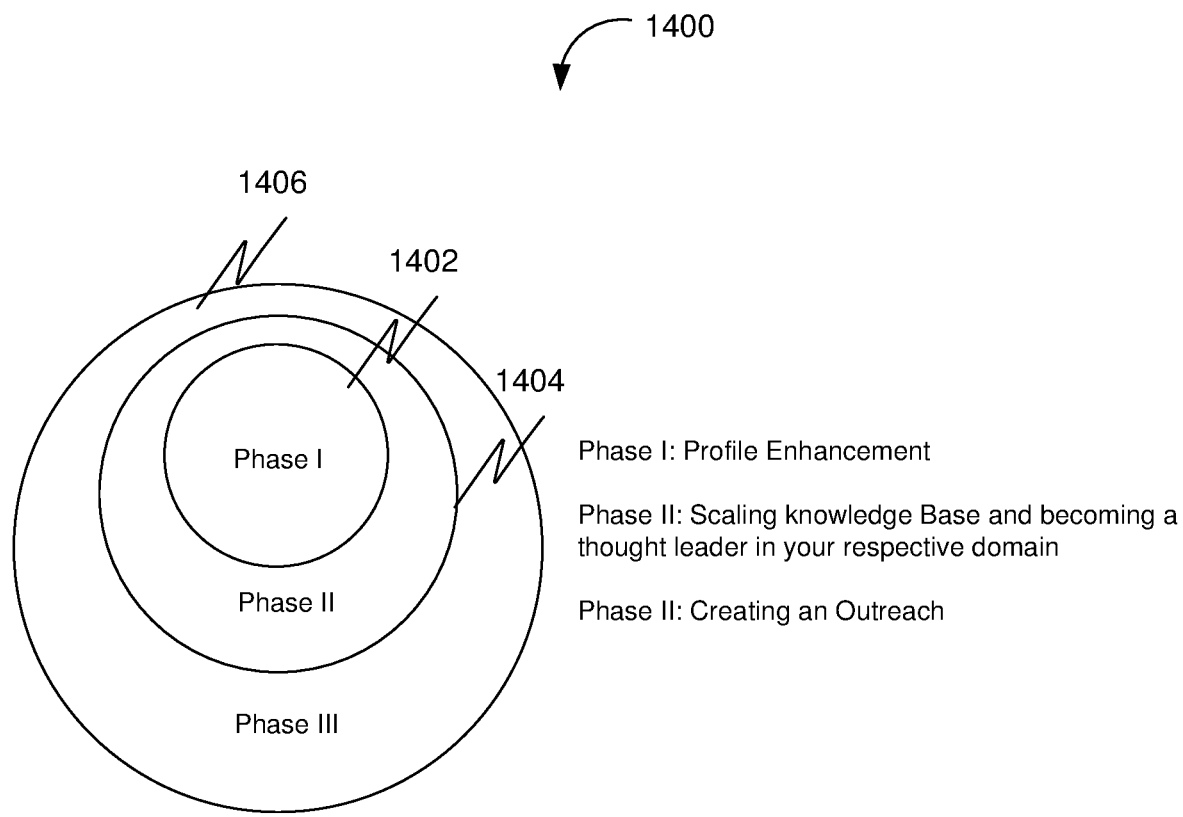
FIG. 14 illustrates a coaching program 1400 of the expertise provided by the disclosed system, in accordance with some embodiments.

FIG. 14 illustrates a coaching program 1400 of the expertise provided by the disclosed system, in accordance with some embodiments. Accordingly, the disclosed system may help the individual to be a successful EB-1A candidate. Further, in an exemplary embodiment, the coaching program 1400 may include next league EB-1A coaching program. Further, the coaching program 1400 may include a first phase 1402. Further, the first phase 1402 may include profile enhancement. Further, the coaching program 1400 may include a second phase 1404. Further, the second phase 1404 may include scaling a knowledge base and becoming a thought leader in a respective domain. Further, the coaching program 1400 may include a third phase 1406. Further, the third phase 1406 may include creating an outreach. Further, the coaching program 1400 may be executed as a software application by a computing device, a server, etc.

FIG. 15 illustrates a block diagram of the system 1100 of facilitating modeling expertise of individuals, in accordance with some embodiments.

FIG. 16 illustrates a block diagram of the system 1100 of facilitating modeling expertise of individuals, in accordance with some embodiments.

Although the invention has been explained in relation to its preferred embodiment, it is to be understood that many other possible modifications and variations can be made without departing from the spirit and scope of the invention as hereinafter claimed.

REFERENCES 1. https://www.uscis.gov/policy-manual/volume-6-part-f-chapter-2
2. https://www.nafsa.org/sites/default/files/media/document/USCIS2010KazarianMemo.pdf
3. https://www.nafsa.org/sites/default/files/ektron/uploaded-Files/kazariandecision.pdf
4. http://theseltzerfirm.com/immigration-options/eb-1-eb-2/ten-tips-for-making-your-eb-1eb-2-i-140-petition-extraordinary/5.
5. http://myattorneyusa.com/storage/upload/files/matters/matter-of-h-t-dec-11-2018.pdf
6. https://nyujlpp.org/wp-content/uploads/2021/04/AI-immigration-pathway-tables-4.pdf
7. https://www.aila.org/File/Related/19060633ct.pdf
8. https://www.hsdl.org/?view&did=11225
9. https://www.yaolawgroup.com/when-to-use-comparable-evidence-in-eb-1a-cases/10.
10. https://www.uscis.gov/sites/default/files/document/policy-manual-updates/20220323-ExtraordinaryAbility.pdf
11. https://scholarshipscorner.website/facebook-fellowship-program/12.
12. https://www.uscis.gov/working-in-the-united-states/permanent-workers/employment-based-immigration-first-preference-eb-1
13. http://tiny.cc/Public-Domain-Links

The invention claimed is:

1. A method of facilitating modeling expertise of individuals, wherein the method comprises:
receiving, using a communication device, at least one individual information associated with an individual from at least one user device;
analyzing, using a processing device, the at least one individual information, wherein the analyzing of the at least one individual information comprises analyzing the at least one individual information using a plurality of criteria of the expertise, wherein the analyzing further comprises analyzing the at least one individual information using a natural language processing model;
determining, using the processing device, an incompleteness of at least one of the plurality of criteria of the expertise based on the analyzing of the at least one individual information;
generating, using the processing device, at least one prompt for the individual based on the determining of the incompleteness, wherein the generating of the at least one prompt is initiated based on at least one predefined condition, wherein the at least one predefined condition is based on at least one contextual variable, wherein the at least one contextual variable represents a condition relevant to the generating of the at least one prompt, wherein the at least one contextual variable comprises at least one of a location, a time, and an identity of the individual;
presenting, using an output device, the at least one prompt;
generating, using a motion sensor, at least one response corresponding to the at least one prompt based on capturing a gesture of the individual;
analyzing, using the processing device, the at least one response;
determining, using the processing device, at least one task associated with the individual based on the analyzing of the at least one individual information using the natural language processing model;
determining, using the processing device, at least one task information associated with the at least one task based on the determining of the at least one task, wherein the determining of the at least one task information is initiated based on the at least one predefined condition, wherein the at least one contextual variable based on the at least one predefined condition further represents a condition relevant to the determining of the at least one task information, wherein the at least one contextual variable further comprises a physical state of the at least one user device, wherein the at least one user device comprises at least one sensor for generating the physical state of the at least one user device;
analyzing, using the processing device, the at least one task information;
determining, using the processing device, an expertise of the individual based on the analyzing of the at least one task information and the analyzing of the at least one individual information;
identifying, using the processing device, a domain of the expertise of the individual and a plurality of reference individuals associated with the domain based on the analyzing of the at least one individual information;
retrieving, using a storage device, a plurality of information associated with the plurality of reference individuals based on the identifying;
analyzing, using the processing device, the plurality of information;
determining, using the processing device, a comparative expertise of each of the plurality of reference individuals based on the analyzing of the plurality of information;
determining, using the processing device, at least one expertise metric for measuring the comparative expertise of each of the plurality of reference individuals based on the analyzing of the plurality of information and the determining of the comparative expertise, wherein the measuring of the comparative expertise comprises qualitatively and quantitatively measuring each of a learning state, a progressive experience, and an impact factor for each of the plurality of reference individuals;
generating, using the processing device, at least one parameter comprising at least one variable for at least one machine learning model based on the determining of the at least one expertise metric;
tuning, using the processing device, at least one machine learning algorithm of the at least one machine learning model based on the at least one variable of the at least one parameter;
generating, using the processing device, an expertise profile of the expertise of the individual using the at least one machine learning model based on the analyzing of the at least one individual information and the tuning, wherein the expertise profile characterizes the expertise of the individual based on each of the learning state, the progressive experience, and the impact factor, wherein the expertise profile comprises a value corresponding to each of the learning state, the progressive experience, and the impact factor, wherein the value corresponding to the learning state comprises one of a data stage, an information stage, a skill stage, a knowledge stage, a wisdom stage, and an enlightenment stage, wherein the at least one machine learning model is trained to provide values corresponding to the learning state, the progressive experience, and the impact factor using the at least one individual information, wherein the generating of the expertise profile is further based on the analyzing of the at least one response, wherein the generating of the expertise profile of the expertise of the individual is further based on the determining of the expertise of the individual;

transmitting, using the communication device, the expertise profile to the at least one user device; and storing, using the storage device, the at least one individual information and the expertise profile.

2. The method of claim 1 wherein the storing further comprises storing the at least one individual information and the expertise profile of the individual in a distributed ledger.

3. The method of claim 1 further comprising:

generating, using the processing device, a required expertise profile for the at least one task using the at least one machine learning model based on the analyzing of the at least one task information;

comparing, using the processing device, the expertise profile and the required expertise profile;

determining, using the processing device, an inadequacy of the expertise profile for the at least one task based on the comparing;

generating, using the processing device, at least one recommendation for overcoming the inadequacy based on the determining of the inadequacy; and transmitting, using the communication device, the at least one recommendation to the at least one user device.

4. The method of claim 1 further comprising:

determining, using the processing device, at least one metric for measuring the expertise based on the analyzing of the at least one individual information; and generating, using the processing device, at least one metric value for the at least one metric based on the determining of the at least one metric and the analyzing of the at least one individual information, wherein the at least one metric corresponds to at least one of the learning state, the progressive experience, and the impact factor, wherein the generating of the at least one metric value for the at least one metric is initiated based on the at least one predefined condition, wherein the at least one contextual variable based on the at least one predefined condition further represents a condition relevant to the generating of the at least one metric value, wherein the at least one contextual variable further comprises a semantic content of the at least one individual information, wherein the generating of the expertise profile is further based on the at least one metric value of the at least one metric.

5. The method of claim 4 further comprising:

retrieving, using the storage device, at least one additional individual information associated with the individual based on the determining of the at least one metric and the at least one individual information, wherein the at least one individual information further comprises at least one individual identifier of the individual; and analyzing, using the processing device, the at least one additional individual information, wherein the generating of the expertise profile is further based on the analyzing of the at least one additional individual information.

6. The method of claim 1 wherein the analyzing further comprises analyzing the at least one individual information using a natural language processing model, wherein the method further comprises:

determining, using the processing device, at least one assertion made by the individual regarding the expertise based on the analyzing of the at least one individual information using the natural language processing model;

retrieving, using the storage device, at least one assertion information associated with the at least one assertion based on the determining of the at least one assertion;

analyzing, using the processing device, the at least one assertion information;

determining, using the processing device, an invalidity of the at least one assertion based on the analyzing of the at least one assertion information;

modifying, using the processing device, the at least one individual information for generating at least one modified individual information for the individual based on the determining of the invalidity of the at least one assertion;

analyzing, using the processing device, the at least one modified individual information, wherein the generating of the expertise profile is further based on the analyzing of the at least one modified individual information; and storing, using the storage device, the at least one modified individual information in a distributed ledger.

7. The method of claim 1 wherein the analyzing of the plurality of information further comprises analyzing the plurality of information using at least one first machine learning model, wherein the at least one first machine learning model is trained for comparing expertise of reference individuals relatively based on information, wherein the generating of the comparative expertise is further based on the analyzing of the plurality of information using the at least one first machine learning model.

8. A system for facilitating modeling expertise of individuals, the system comprising:

a communication device configured for:

receiving at least one individual information associated with an individual from at least one user device; and transmitting an expertise profile to the at least one user device;

a processing device communicatively coupled with the communication device, wherein the processing device is configured for:

analyzing the at least one individual information, wherein the analyzing of the at least one individual information comprises analyzing the at least one individual information using a plurality of criteria of the expertise, wherein the analyzing further comprises analyzing the at least one individual information using a natural language processing model;

determining an incompleteness of at least one of the plurality of criteria of the expertise based on the analyzing of the at least one individual information;

generating at least one prompt for the individual based on the determining of the incompleteness, wherein the generating of the at least one prompt is initiated based on at least one predefined condition, wherein the at least one predefined condition is based on at least one contextual variable, wherein the at least one contextual variable represents a condition relevant to the generating of the at least one prompt, wherein the at least one contextual variable comprises at least one of a location, a time, and an identity of the individual;
analyzing at least one response corresponding to the at least one prompt;
determining at least one task associated with the individual based on the analyzing of the at least one individual information using the natural language processing model;
determining at least one task information associated with the at least one task based on the determining of the at least one task, wherein the determining of the at least one task information is initiated based on the at least one predefined condition, wherein the at least one contextual variable based on the at least one predefined condition further represents a condition relevant to the determining of the at least one task information, wherein the at least one contextual variable further comprises a physical state of the at least one user device, wherein the at least one user device comprises at least one sensor for generating the physical state of the at least one user device;
analyzing the at least one task information;
determining an expertise of the individual based on the analyzing of the at least one task information and the analyzing of the at least one individual information;
identifying a domain of the expertise of the individual and a plurality of reference individuals associated with the domain based on the analyzing of the at least one individual information;
analyzing a plurality of information;
determining a comparative expertise of each of the plurality of reference individuals based on the analyzing of the plurality of information;
determining at least one expertise metric for measuring the comparative expertise of each of the plurality of reference individuals based on the analyzing of the plurality of information and the determining of the comparative expertise, wherein the measuring of the comparative expertise comprises qualitatively and quantitatively measuring each of a learning state, a progressive experience, and an impact factor for each of the plurality of reference individuals;
generating at least one parameter comprising at least one variable for at least one machine learning model based on the determining of the at least one expertise metric;
tuning at least one machine learning algorithm of the at least one machine learning model based on the at least one variable of the at least one parameter; and
generating the expertise profile of the expertise of the individual using the at least one machine learning model based on the analyzing of the at least one individual information and the tuning, wherein the expertise profile characterizes the expertise of the individual based on each of the learning state, the progressive experience, and the impact factor, wherein the expertise profile comprises a value corresponding to each of the learning state, the progressive experience, and the impact factor, wherein the value corresponding to the learning state comprises one of a data stage, an information stage, a skill stage, a knowledge stage, a wisdom stage, and an enlightenment stage, wherein the at least one machine learning model is trained to provide values corresponding to the learning state, the progressive experience, and the impact factor using the at least one individual information, wherein the generating of the expertise profile is further based on the analyzing of the at least one response, wherein the generating of the expertise profile of the expertise of the individual is further based on the determining of the expertise of the individual;

an output device configured for presenting the at least one prompt;
a motion sensor configured for generating the at least one response corresponding to the at least one prompt based on capturing a gesture of the individual; and
a storage device communicatively coupled with the processing device, wherein the storage device is configured for:
retrieving the plurality of information associated with the plurality of reference individuals based on the identifying; and
storing the at least one individual information and the expertise profile.

9. The system of claim 8 wherein the storing further comprises storing the at least one individual information and the expertise profile of the individual in a distributed ledger.

10. The system of claim 8 wherein the processing device is further configured for:
generating a required expertise profile for the at least one task using the at least one machine learning model based on the analyzing of the at least one task information;
comparing the expertise profile and the required expertise profile;
determining an inadequacy of the expertise profile for the at least one task based on the comparing; and
generating at least one recommendation for overcoming the inadequacy based on the determining of the inadequacy, wherein the communication device is further configured for transmitting the at least one recommendation to the at least one user device.

11. The system of claim 8 wherein the processing device is further configured for:
determining at least one metric for measuring the expertise based on the analyzing of the at least one individual information; and
generating at least one metric value for the at least one metric based on the determining of the at least one metric and the analyzing of the at least one individual information, wherein the at least one metric corresponds to at least one of the learning state, the progressive experience, and the impact factor, wherein the generating of the at least one metric value for the at least one metric is initiated based on the at least one predefined condition, wherein the at least one contextual variable based on the at least one predefined condition further represents a condition relevant to the generating of the at least one metric value, wherein the at least one contextual variable further comprises a semantic content of the at least one individual information, wherein the generating of the expertise profile is further based on the at least one metric value of the at least one metric.

12. The system of claim 11 wherein the storage device is further configured for retrieving at least one additional individual information associated with the individual based on the determining of the at least one metric and the at least one individual information, wherein the at least one individual information further comprises at least one individual identifier of the individual, wherein the processing device is further configured for analyzing the at least one additional individual information, wherein the generating of the expertise profile is further based on the analyzing of the at least one additional individual information.

13. The system of claim 8 wherein the analyzing further comprises analyzing the at least one individual information using a natural language processing model, wherein the processing device is further configured for:
   determining at least one assertion made by the individual regarding the expertise based on the analyzing of the at least one individual information using the natural language processing model;
   analyzing at least one assertion information;
   determining an invalidity of the at least one assertion based on the analyzing of the at least one assertion information;
   modifying the at least one individual information for generating at least one modified individual information for the individual based on the determining of the invalidity of the at least one assertion; and
   analyzing the at least one modified individual information, wherein the generating of the expertise profile is further based on the analyzing of the at least one modified individual information, wherein the storage device is further configured for:
   retrieving the at least one assertion information associated with the at least one assertion based on the determining of the at least one assertion; and
   storing the at least one modified individual information in a distributed ledger.

14. The system of claim 8 wherein the analyzing of the plurality of information further comprises analyzing the plurality of information using at least one first machine learning model, wherein the at least one first machine learning model is trained for comparing expertise of reference individuals relatively based on information, wherein the generating of the comparative expertise is further based on the analyzing of the plurality of information using the at least one first machine learning model.

\* \* \* \* \*